US012437542B2

(12) United States Patent
Evans et al.

(10) Patent No.: US 12,437,542 B2
(45) Date of Patent: Oct. 7, 2025

(54) METHODS AND SYSTEMS EMPLOYING IMAGE SENSING AND 3D SENSING TO IDENTIFY SHELVED PRODUCTS

(71) Applicant: Digimarc Corporation, Beaverton, OR (US)

(72) Inventors: Eric D. Evans, Portland, OR (US); Bryan Olmstead, Eugene, OR (US)

(73) Assignee: Digimarc Corporation, Beaverton, OR (US)

(*) Notice: Subject to any disclaimer, the term of this patent is extended or adjusted under 35 U.S.C. 154(b) by 574 days.

(21) Appl. No.: 17/476,608

(22) Filed: Sep. 16, 2021

(65) Prior Publication Data
US 2022/0076027 A1     Mar. 10, 2022

Related U.S. Application Data

(62) Division of application No. 16/714,258, filed on Dec. 13, 2019, now Pat. No. 11,126,861.
(Continued)

(51) Int. Cl.
*G06V 20/52*     (2022.01)
*G06K 7/14*      (2006.01)
(Continued)

(52) U.S. Cl.
CPC ............ *G06V 20/52* (2022.01); *G06K 7/1413* (2013.01); *G06K 19/06028* (2013.01);
(Continued)

(58) Field of Classification Search
CPC ................. G06V 20/52; G06K 7/1413; G06K 19/06028; G06Q 10/087; H04N 23/58;
(Continued)

(56) References Cited

U.S. PATENT DOCUMENTS 4,751,660 A     6/1988 Hedley
4,929,819 A     5/1990 Collins
(Continued)

FOREIGN PATENT DOCUMENTS

WO          9921359 A1     4/1999
WO       2013124407 A1     8/2013

OTHER PUBLICATIONS

Henry, Are Your Shelves Protected From Organized Retail Theft?, IT Retail, 2011.
(Continued)

*Primary Examiner* — Hwa Andrew Lee
(74) *Attorney, Agent, or Firm* — Klarquist Sparkman, LLLP

(57) ABSTRACT

Inventory on a rack of store shelves is monitored by a camera-equipped system that senses when items have been removed. Image data is desirably sensed at plural spectral bands, to enhance item identification by digital watermark and/or other image recognition techniques. The system can be alert to the presence of nearby shoppers, and change its mode of operation in response, e.g., suppressing flash illumination or suspending image capture. The system may self-calibrate to the geometry of shelving in its field of view, and affine-correct captured imagery based on the camera's viewpoint. A great many other features and arrangements are also detailed.

18 Claims, 12 Drawing Sheets

Related U.S. Application Data

(60) Provisional application No. 62/780,100, filed on Dec. 14, 2018.

(51) Int. Cl.
*G06K 19/06* (2006.01)
*G06Q 10/087* (2023.01)
*H04N 23/58* (2023.01)
*H04N 23/72* (2023.01)

(52) U.S. Cl.
CPC .......... *G06Q 10/087* (2013.01); *H04N 23/58* (2023.01); *H04N 23/72* (2023.01)

(58) Field of Classification Search
CPC ...... H04N 23/72; H04N 23/56; H04N 23/695; H04N 23/74
See application file for complete search history.

(56) References Cited

U.S. PATENT DOCUMENTS

| | | |
|---|---|---|
| 6,195,121 B1 | 2/2001 | Huang |
| 6,201,574 B1 | 3/2001 | Martin |
| 6,243,131 B1 | 6/2001 | Martin |
| 6,345,104 B1 | 2/2002 | Rhoads |
| 6,542,927 B2 | 4/2003 | Rhoads |
| 6,590,996 B1 | 7/2003 | Reed |
| 6,912,295 B2 | 6/2005 | Reed |
| 6,919,795 B2 | 7/2005 | Roseen |
| 6,975,744 B2 | 12/2005 | Sharma |
| 6,999,600 B2 | 2/2006 | Venetianer |
| 7,035,479 B2 | 4/2006 | Coffland |
| 7,100,824 B2 | 9/2006 | Ostrowski |
| 7,290,707 B2 | 11/2007 | Sawasaki |
| 7,422,147 B2 | 9/2008 | Rosenbaum |
| 7,511,756 B2 | 3/2009 | Kawai |
| 7,533,079 B2 | 5/2009 | Naito |
| 7,652,687 B2 | 1/2010 | Sorensen |
| 7,688,349 B2 | 3/2010 | Flickner |
| 7,693,757 B2 | 4/2010 | Zimmerman |
| 7,714,936 B1 | 5/2010 | Martin |
| 7,780,081 B1 | 8/2010 | Liang |
| 7,796,780 B2 | 9/2010 | Lipton |
| 7,801,330 B2 | 9/2010 | Zhang |
| 7,834,907 B2 | 11/2010 | Kawai |
| 7,949,568 B2 | 5/2011 | Fano |
| 7,986,806 B2 | 7/2011 | Rhoads |
| 8,009,864 B2 | 8/2011 | Linaker |
| 8,050,984 B2 | 11/2011 | Bonner |
| 8,091,782 B2 | 1/2012 | Cato |
| 8,140,185 B2 | 3/2012 | Simmons |
| 8,150,658 B2 | 4/2012 | Beniyama |
| 8,160,304 B2 | 4/2012 | Rhoads |
| 8,189,855 B2 | 5/2012 | Opalach |
| 8,210,430 B1 | 7/2012 | Grant |
| 8,325,036 B1 | 12/2012 | Fuhr |
| 8,340,453 B1 | 12/2012 | Chen |
| 8,401,224 B2 | 3/2013 | Rhoads |
| 8,429,004 B2 | 4/2013 | Hamilton |
| 8,473,374 B2 | 6/2013 | Allison |
| 8,577,136 B1 | 11/2013 | Ascher |
| 8,577,705 B1 | 11/2013 | Baboo |
| 8,630,924 B2 | 1/2014 | Groenevelt |
| 9,015,072 B2 | 4/2015 | Wu |
| 9,076,042 B2 | 7/2015 | Saptharishi |
| 9,124,778 B1 | 9/2015 | Crabtree |
| 9,135,491 B2 | 9/2015 | Morandi |
| 9,174,800 B1 | 11/2015 | Curlander |
| 9,183,580 B2 | 11/2015 | Rhoads |
| 9,262,681 B1 | 2/2016 | Mishra |
| 9,269,124 B2 | 2/2016 | Yagi |
| 9,317,775 B2 | 4/2016 | Moraleda |
| 9,330,474 B1 | 5/2016 | Shekar |
| 9,373,057 B1 | 6/2016 | Erhan |
| 9,412,099 B1 | 8/2016 | Tyree |
| 9,451,406 B2 | 9/2016 | Cornaby |
| 9,473,747 B2 | 10/2016 | Kobres |
| 9,558,398 B2 | 1/2017 | Iwai |
| 9,805,266 B2 | 10/2017 | Zhang |
| 9,811,802 B1 | 11/2017 | Curlander |
| 9,906,712 B2 | 2/2018 | Garcia Morate |
| 9,984,451 B2 | 5/2018 | Gormish |
| 9,996,818 B1 | 6/2018 | Ren |
| 10,001,402 B1 | 6/2018 | Gyori |
| 10,007,964 B1 | 6/2018 | Calhoon |
| 10,064,502 B1 | 9/2018 | Gyori |
| 10,083,453 B2 | 9/2018 | Campbell |
| 10,127,438 B1 | 11/2018 | Fisher |
| 10,134,004 B1 | 11/2018 | Liberato, Jr. |
| 10,157,452 B1 | 12/2018 | Tighe |
| 10,163,149 B1 | 12/2018 | Famularo |
| 10,165,194 B1 | 12/2018 | Baldwin |
| 10,169,660 B1 | 1/2019 | Ren |
| 10,169,677 B1 | 1/2019 | Ren |
| 10,176,456 B2 | 1/2019 | Puerini |
| 10,242,434 B1 | 3/2019 | Holub |
| 10,244,363 B1 | 3/2019 | Niranjayan |
| 10,250,868 B1 | 4/2019 | Arnold |
| 10,262,293 B1 | 4/2019 | Prater |
| 10,262,294 B1 | 4/2019 | Hahn |
| 10,268,983 B2 | 4/2019 | Kumar |
| 10,285,765 B2 | 5/2019 | Sachs |
| 10,291,862 B1 | 5/2019 | Liberato |
| 10,296,814 B1 | 5/2019 | Kumar |
| 10,303,187 B1 | 5/2019 | McNamara |
| 10,304,034 B1 | 5/2019 | Curlander |
| 10,304,175 B1 | 5/2019 | Curlander |
| 10,318,917 B1 | 6/2019 | Goldstein |
| 10,319,021 B1 | 6/2019 | Manyam |
| 10,332,066 B1 | 6/2019 | Palaniappan |
| 10,332,183 B1 | 6/2019 | Dogan |
| 10,339,493 B1 | 7/2019 | Famularo |
| 10,353,982 B1 | 7/2019 | Kumar |
| 10,366,306 B1 | 7/2019 | Raghavan |
| 10,368,057 B1 | 7/2019 | Saran |
| 10,384,869 B1 | 8/2019 | Shiee |
| 10,388,019 B1 | 8/2019 | Hua |
| 10,417,696 B2 | 9/2019 | Graham |
| 10,438,164 B1 | 10/2019 | Xiong |
| 10,438,259 B1 | 10/2019 | Boyapati |
| 10,438,277 B1 | 10/2019 | Jiang |
| 10,445,593 B1 | 10/2019 | Mathiesen |
| 10,459,103 B1 | 10/2019 | Shi |
| 10,466,095 B1 | 11/2019 | O'Neill |
| 10,475,185 B1 | 11/2019 | Raghavan |
| 10,488,912 B1 | 11/2019 | Sinclair |
| 10,515,309 B1 | 12/2019 | McNamara |
| 10,540,631 B1 | 1/2020 | Munger |
| 10,546,204 B1 | 1/2020 | Kumar |
| 10,552,750 B1 | 2/2020 | Raghavan |
| 10,552,933 B1 | 2/2020 | Calhoon |
| 10,592,854 B2 | 3/2020 | Schwartz |
| 10,630,959 B2 | 4/2020 | Olmstead |
| 10,671,856 B1 | 6/2020 | Ren |
| 10,733,661 B1 | 8/2020 | Bergstrom |
| 2002/0114491 A1 | 8/2002 | Sharma |
| 2002/0147597 A1 | 10/2002 | Connors |
| 2003/0154141 A1 | 8/2003 | Capazario |
| 2005/0104958 A1 | 5/2005 | Egnal |
| 2005/0189411 A1 | 9/2005 | Ostrowski |
| 2005/0189412 A1 | 9/2005 | Hudnut |
| 2006/0032915 A1 | 2/2006 | Schwartz |
| 2006/0243798 A1 | 11/2006 | Kundu |
| 2007/0069028 A1 | 3/2007 | Nemet |
| 2007/0084918 A1 | 4/2007 | Tabet |
| 2007/0158417 A1 | 7/2007 | Brewington |
| 2007/0179921 A1 | 8/2007 | Zitnick |
| 2008/0018738 A1 | 1/2008 | Lipton |
| 2008/0077510 A1 | 3/2008 | Dielemans |
| 2008/0077511 A1 | 3/2008 | Zimmerman |
| 2008/0215462 A1 | 9/2008 | Sorensen |
| 2008/0249859 A1 | 10/2008 | Angell |
| 2008/0306787 A1 | 12/2008 | Hamilton |
| 2009/0003653 A1 | 1/2009 | Takahata |

(56) References Cited

U.S. PATENT DOCUMENTS

| | | |
|---|---|---|
| 2009/0017779 A1 | 1/2009 | Bonner |
| 2009/0057395 A1 | 3/2009 | He |
| 2009/0059270 A1 | 3/2009 | Opalach |
| 2009/0060259 A1 | 3/2009 | Goncalves |
| 2009/0063306 A1 | 3/2009 | Fano |
| 2009/0063307 A1 | 3/2009 | Groenovelt |
| 2009/0094140 A1 | 4/2009 | Kwan |
| 2009/0121017 A1 | 5/2009 | Cato |
| 2009/0152348 A1 | 6/2009 | Ostrowski |
| 2009/0160975 A1 | 6/2009 | Kwan |
| 2009/0192882 A1 | 7/2009 | Narahashi |
| 2009/0192921 A1 | 7/2009 | Hicks |
| 2009/0204512 A1 | 8/2009 | Connell |
| 2009/0231425 A1 | 9/2009 | Zalewski |
| 2009/0257624 A1 | 10/2009 | Ikumi |
| 2009/0259571 A1 | 10/2009 | Ebling |
| 2009/0268028 A1 | 10/2009 | Ikumi |
| 2009/0282025 A1 | 11/2009 | Winter |
| 2009/0285483 A1 | 11/2009 | Guven |
| 2009/0306819 A1 | 12/2009 | Insolia |
| 2009/0319340 A1 | 12/2009 | Sekine |
| 2010/0059589 A1 | 3/2010 | Goncalves |
| 2010/0111440 A1 | 5/2010 | Chai |
| 2010/0123005 A1 | 5/2010 | Guess |
| 2010/0217678 A1 | 8/2010 | Goncalves |
| 2010/0287057 A1 | 11/2010 | Aihara |
| 2011/0011936 A1 | 1/2011 | Morandi |
| 2011/0103646 A1 | 5/2011 | Zeller |
| 2011/0214044 A1 | 9/2011 | Davis |
| 2011/0215147 A1 | 9/2011 | Goncalves |
| 2011/0254860 A1 | 10/2011 | Zontrop |
| 2011/0320322 A1 | 12/2011 | Roslak |
| 2012/0041845 A1 | 2/2012 | Rothschild |
| 2012/0046044 A1 | 2/2012 | Jamtgaard |
| 2012/0046071 A1 | 2/2012 | Brandis |
| 2012/0062596 A1 | 3/2012 | Bedi |
| 2012/0095853 A1 | 4/2012 | Von Bose |
| 2012/0127314 A1 | 5/2012 | Clements |
| 2012/0200385 A1 | 8/2012 | Savage |
| 2012/0208592 A1 | 8/2012 | Davis |
| 2012/0209749 A1 | 8/2012 | Hammad |
| 2012/0214515 A1 | 8/2012 | Davis |
| 2012/0224743 A1 | 9/2012 | Rodriguez |
| 2012/0233025 A1 | 9/2012 | Calman |
| 2012/0235887 A1 | 9/2012 | Border |
| 2012/0245969 A1 | 9/2012 | Campbell |
| 2012/0249727 A1 | 10/2012 | Corcoran |
| 2012/0271712 A1 | 10/2012 | Katzin |
| 2012/0323620 A1 | 12/2012 | Hofman |
| 2013/0030915 A1 | 1/2013 | Statler |
| 2013/0039543 A1 | 2/2013 | Fuhr |
| 2013/0076898 A1 | 3/2013 | Philippe |
| 2013/0083064 A1 | 4/2013 | Geisner |
| 2013/0103608 A1 | 4/2013 | Scipioni |
| 2013/0117153 A1 | 5/2013 | Shen |
| 2013/0176398 A1 | 7/2013 | Bonner |
| 2013/0182114 A1 | 7/2013 | Zhang |
| 2013/0223673 A1 | 8/2013 | Davis |
| 2013/0284806 A1 | 10/2013 | Margalit |
| 2013/0286048 A1 | 10/2013 | Sternitzke |
| 2013/0293530 A1 | 11/2013 | Perez |
| 2013/0339115 A1 | 12/2013 | Soldate |
| 2014/0002643 A1 | 1/2014 | Aziz |
| 2014/0003727 A1 | 1/2014 | Lortz |
| 2014/0029809 A1 | 1/2014 | Rhoads |
| 2014/0043162 A1 | 2/2014 | Siciliano |
| 2014/0052555 A1 | 2/2014 | Macintosh |
| 2014/0111380 A1 | 4/2014 | Gibbs |
| 2014/0119593 A1 | 5/2014 | Filler |
| 2014/0132728 A1 | 5/2014 | Verano |
| 2014/0152874 A1 | 6/2014 | Clayton |
| 2014/0164124 A1 | 6/2014 | Rhoads |
| 2014/0244514 A1 | 8/2014 | Rodriguez |
| 2014/0304107 A1 | 10/2014 | McAllister |
| 2014/0304122 A1 | 10/2014 | Rhoads |
| 2014/0316916 A1 | 10/2014 | Hay |
| 2014/0324642 A1 | 10/2014 | Winkel |
| 2014/0338987 A1 | 11/2014 | Kobres |
| 2014/0343846 A1 | 11/2014 | Goldman |
| 2014/0344118 A1 | 11/2014 | Parpia |
| 2014/0347475 A1 | 11/2014 | Divakaran |
| 2014/0357312 A1 | 12/2014 | Davis |
| 2014/0365334 A1 | 12/2014 | Hurewitz |
| 2014/0379296 A1 | 12/2014 | Nathan |
| 2015/0016664 A1 | 1/2015 | Rodriguez |
| 2015/0016712 A1 | 1/2015 | Rhoads |
| 2015/0019391 A1 | 1/2015 | Kumar |
| 2015/0025969 A1 | 1/2015 | Schroll |
| 2015/0029339 A1 | 1/2015 | Kobres |
| 2015/0039443 A1 | 2/2015 | Soon-Shiong |
| 2015/0039458 A1 | 2/2015 | Reid |
| 2015/0046299 A1 | 2/2015 | Yan |
| 2015/0049902 A1 | 2/2015 | Moraleda |
| 2015/0049904 A1 | 2/2015 | Sen |
| 2015/0052027 A1 | 2/2015 | Pavani |
| 2015/0057917 A1 | 2/2015 | Cheng |
| 2015/0088701 A1 | 3/2015 | Desmarais |
| 2015/0088703 A1 | 3/2015 | Yan |
| 2015/0117788 A1 | 4/2015 | Patel |
| 2015/0123973 A1 | 5/2015 | Larsen |
| 2015/0127414 A1 | 5/2015 | Geffert |
| 2015/0139536 A1 | 5/2015 | Jin |
| 2015/0154675 A1 | 6/2015 | Todasco |
| 2015/0168538 A1 | 6/2015 | Bradley |
| 2015/0206188 A1 | 7/2015 | Tanigawa |
| 2015/0244911 A1 | 8/2015 | Xie |
| 2015/0244991 A1 | 8/2015 | Noda |
| 2015/0262116 A1 | 9/2015 | Katircioglu |
| 2015/0294333 A1 | 10/2015 | Avegliano |
| 2015/0302543 A1 | 10/2015 | Weaver |
| 2015/0310601 A1 | 10/2015 | Rodriguez |
| 2015/0317667 A1 | 11/2015 | Wohlert |
| 2015/0324725 A1 | 11/2015 | Rosebery |
| 2015/0353758 A1 | 12/2015 | Weber |
| 2015/0363758 A1 | 12/2015 | Wu |
| 2015/0363798 A1 | 12/2015 | Aihara |
| 2015/0365660 A1 | 12/2015 | Wu |
| 2016/0027159 A1 | 1/2016 | Amirghodsi |
| 2016/0044460 A1 | 2/2016 | Cornaby |
| 2016/0119540 A1 | 4/2016 | Wu |
| 2016/0171336 A1 | 6/2016 | Schwartz |
| 2016/0171429 A1 | 6/2016 | Schwartz |
| 2016/0180533 A1 | 6/2016 | Pavani |
| 2016/0189277 A1 | 6/2016 | Davis |
| 2016/0217547 A1 | 7/2016 | Stach |
| 2016/0253794 A1 | 9/2016 | Shekar |
| 2016/0275639 A1 | 9/2016 | Holub |
| 2016/0321518 A1 | 11/2016 | Shekar |
| 2016/0373647 A1 | 12/2016 | García Morate |
| 2017/0024806 A1 | 1/2017 | High |
| 2017/0032311 A1 | 2/2017 | Rizzolo |
| 2017/0091703 A1 | 3/2017 | Olmstead |
| 2017/0099959 A1 | 4/2017 | Hardy |
| 2017/0124508 A1 | 5/2017 | Wasilewsky |
| 2017/0147966 A1 | 5/2017 | Aversa |
| 2017/0178301 A1 | 6/2017 | Moraleda |
| 2017/0178310 A1 | 6/2017 | Gormish |
| 2017/0178372 A1 | 6/2017 | Gormish |
| 2017/0193434 A1 | 7/2017 | Shah |
| 2017/0249491 A1 | 8/2017 | Macintosh |
| 2017/0286773 A1 | 10/2017 | Skaff |
| 2017/0286805 A1 | 10/2017 | Yu |
| 2017/0286901 A1* | 10/2017 | Skaff .................. G06Q 10/087 |
| 2017/0293788 A1 | 10/2017 | Taira |
| 2017/0309136 A1 | 10/2017 | Schoner |
| 2017/0323376 A1 | 11/2017 | Glaser |
| 2017/0357939 A1 | 12/2017 | Jones |
| 2018/0005176 A1* | 1/2018 | Williams ............ G06Q 10/087 |
| 2018/0005343 A1 | 1/2018 | Rhoads |
| 2018/0012267 A1 | 1/2018 | Bordewieck |
| 2018/0102011 A1 | 4/2018 | Phillips |
| 2018/0108134 A1 | 4/2018 | Venable |
| 2018/0165728 A1 | 6/2018 | McDonald |
| 2018/0189763 A1 | 7/2018 | Olmstead |

(56) References Cited

U.S. PATENT DOCUMENTS

| | | |
|---|---|---|
| 2018/0218224 A1 | 8/2018 | Olmstead |
| 2018/0240089 A1 | 8/2018 | Okamoto |
| 2018/0247404 A1 | 8/2018 | Goyal |
| 2018/0251253 A1 | 9/2018 | Taira |
| 2018/0257228 A1 | 9/2018 | Tingler |
| 2018/0285902 A1 | 10/2018 | Nazarian |
| 2018/0293543 A1 | 10/2018 | Tiwari |
| 2018/0332235 A1 | 11/2018 | Glaser |
| 2019/0019293 A1 | 1/2019 | Woodroffe |
| 2019/0030713 A1 | 1/2019 | Gabardos |
| 2019/0034864 A1 | 1/2019 | Skaff |
| 2019/0104866 A1* | 4/2019 | Kobayashi ............. G06V 20/52 |
| 2019/0108561 A1 | 4/2019 | Shivashankar |
| 2019/0130180 A1 | 5/2019 | Shiraishi |
| 2019/0138986 A1 | 5/2019 | Puerini |
| 2019/0149725 A1 | 5/2019 | Adato |
| 2019/0205933 A1 | 7/2019 | Glaser |
| 2019/0213421 A1 | 7/2019 | Adato |
| 2019/0236530 A1 | 8/2019 | Cantrell |
| 2019/0236684 A1 | 8/2019 | Davis |
| 2019/0244163 A1 | 8/2019 | Howard |
| 2019/0251499 A1 | 8/2019 | Kumar |
| 2019/0333039 A1 | 10/2019 | Glaser |
| 2019/0384989 A1 | 12/2019 | Yamazaki |
| 2020/0005225 A1 | 1/2020 | Chaubard |
| 2020/0005231 A1 | 1/2020 | Nakagawa |
| 2020/0118077 A1 | 4/2020 | Schumacher |
| 2020/0118154 A1 | 4/2020 | Schumacher |
| 2020/0279113 A1 | 9/2020 | Yanagi |
| 2020/0334620 A1 | 10/2020 | Yanagi |

OTHER PUBLICATIONS

Japanese Priority Application/Document#JP2017-209440 for US #2020/0334620 to Yanagi, filed Oct. 30, 2017. (Year: 2017).

Seyve etal, machine generated translation of WO 2013/124407A1 (Year: 2013).

Kejriwal et al, Product counting using images with application to robot-based retail stock assessment, 2015 IEEE International Conference on Technologies for Practical Robot Applications (TePRA) May 11, 2015 (pp. 1-6).

Kumar et al, Remote retail monitoring and stock assessment using mobile robots, 2014 IEEE International Conference on Technologies for Practical Robot Applications (TePRA) Apr. 14, 2014 (pp. 1-6).

* cited by examiner

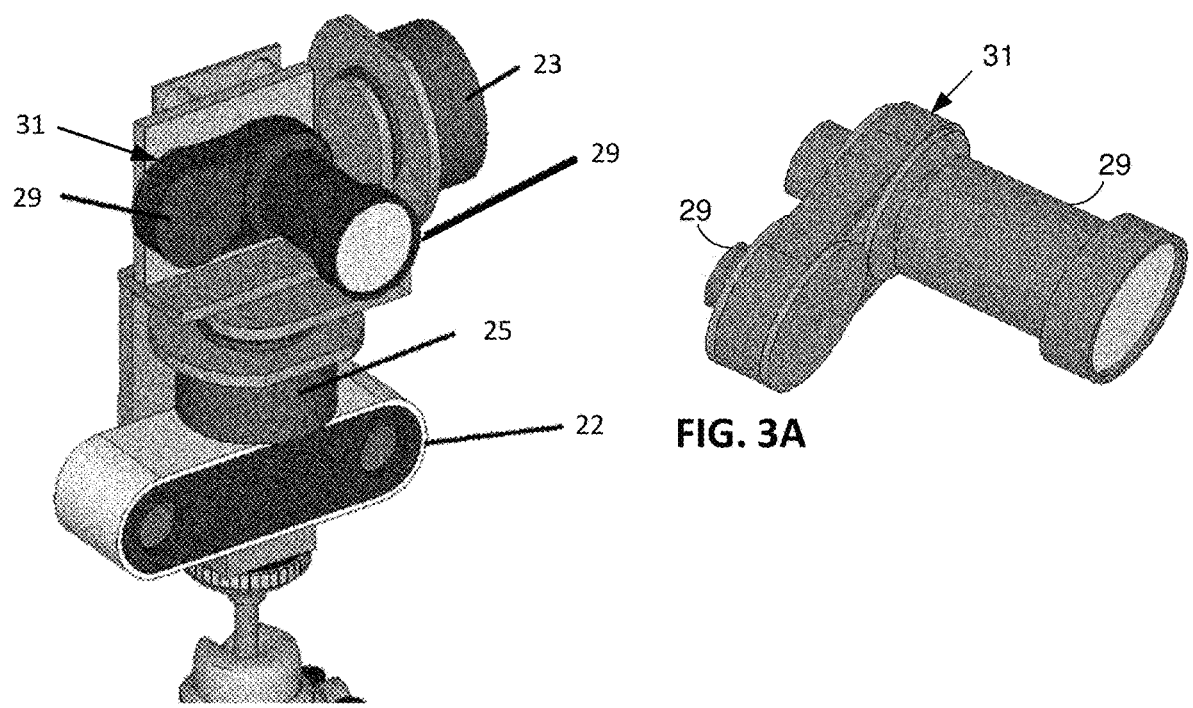
FIG. 3
FIG. 3A
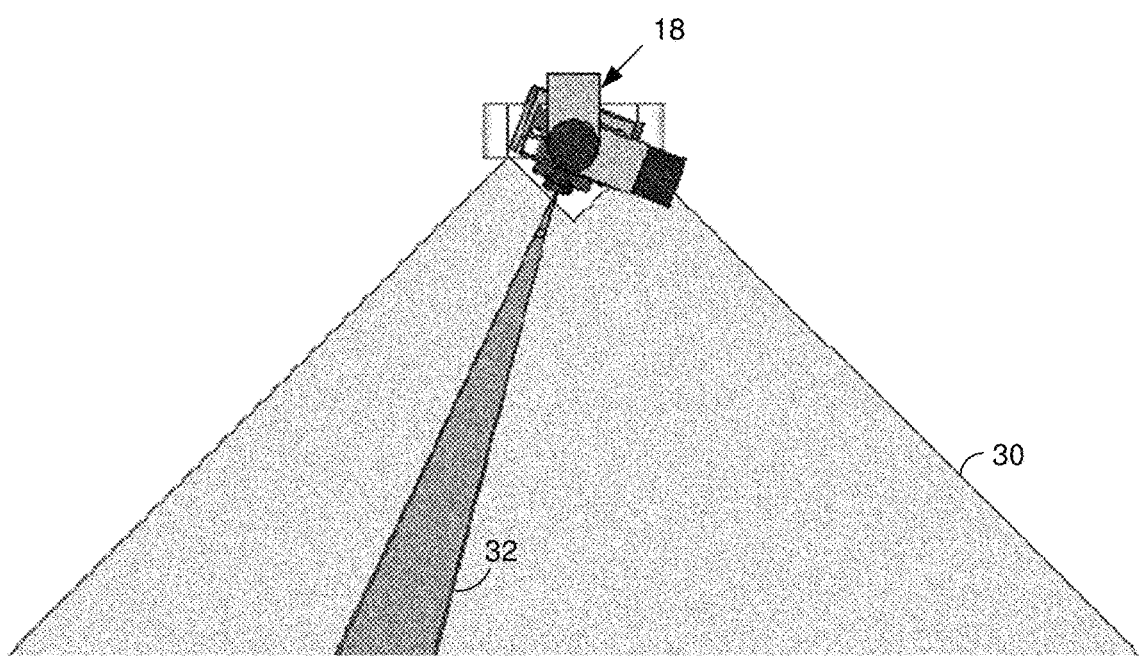
FIG. 4

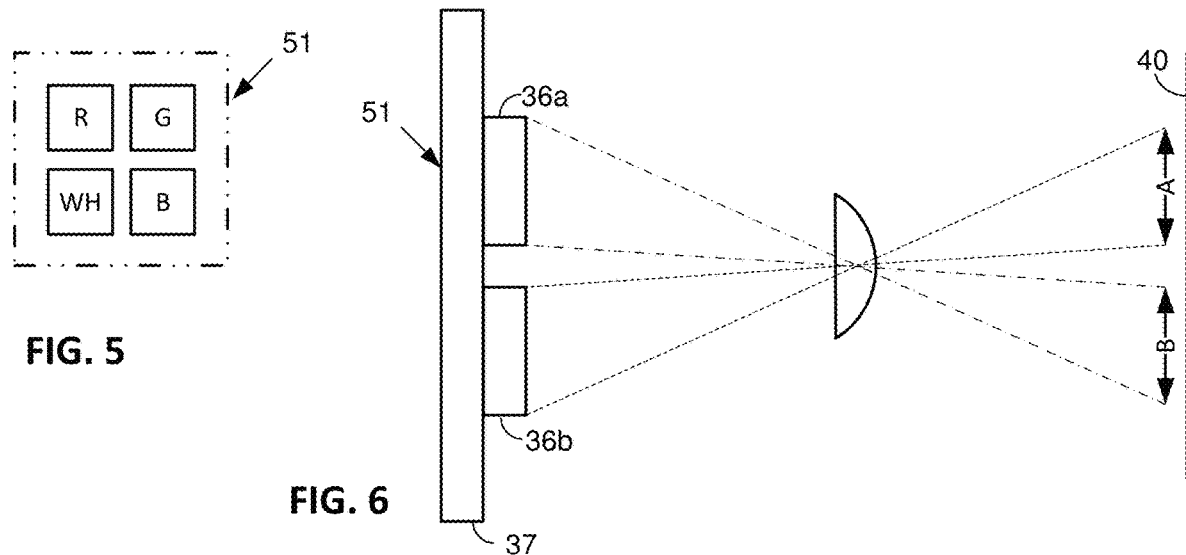
FIG. 5
FIG. 6
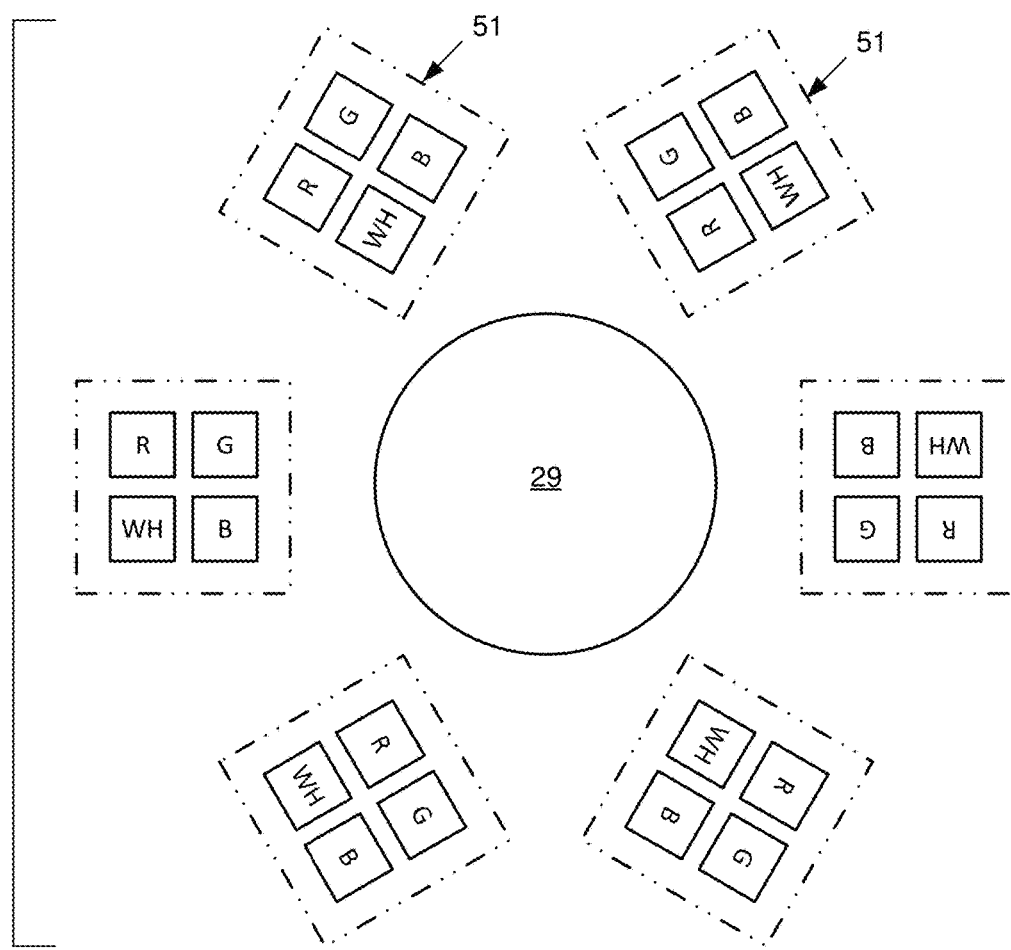
FIG. 7

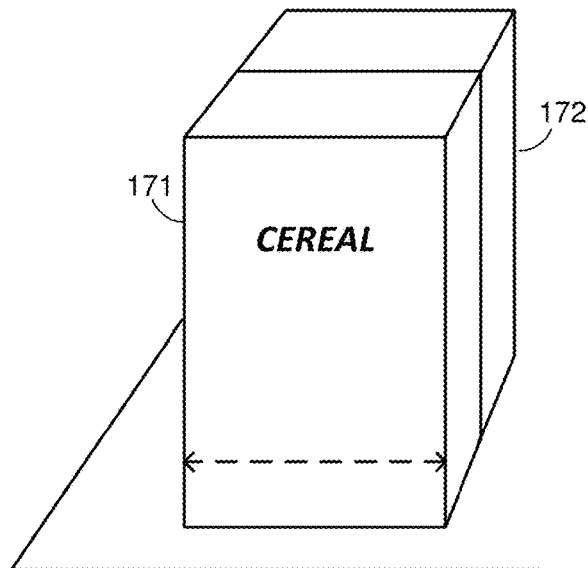
FIG. 16A
FIG. 16B
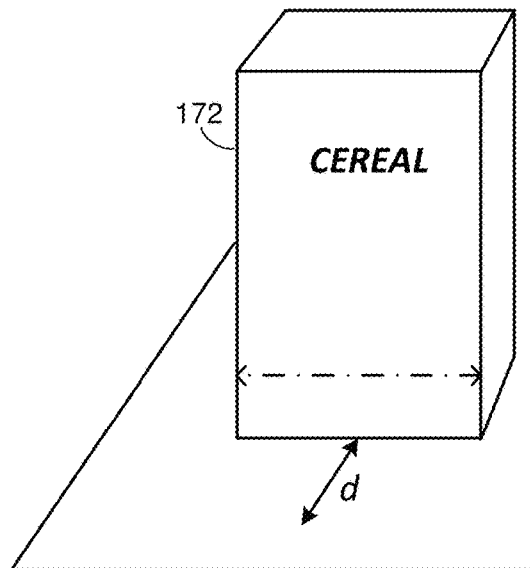
FIG. 17A
FIG. 17B
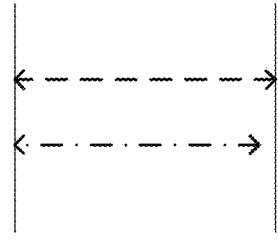
FIG. 17C

METHODS AND SYSTEMS EMPLOYING IMAGE SENSING AND 3D SENSING TO IDENTIFY SHELVED PRODUCTS

RELATED APPLICATION DATA

This application is a division of application Ser. No. 16/714,258, filed Dec. 13, 2019 (now U.S. Pat. No. 11,126,861), which claims priority to provisional application 62/780,100, filed Dec. 14, 2018. The disclosures of these applications are incorporated herein by reference.

INTRODUCTION

Retail stores and warehouse facilities need to track inventory. Historically, this has been done by clerks who periodically survey shelves to determine, e.g., which items are out of stock. Such work is tedious, however, and errors commonly arise. It can also be expensive.

Attempts have been made to automate the task, by using a survey robot that wanders aisles of a store and captures imagery of all it sees, for later analysis. (Drones have been similarly proposed.) Such systems, however, are very expensive, and worrisome to some shoppers. They can also be difficult to maintain.

Both of these approaches also suffer by infrequent updates. For example, data collected by such arrangements provide no insights into times at which particular items were removed from particular shelves—information that can be used in evaluating which persons picked which products, e.g., for cashierless checkout arrangements.

Certain embodiments of the present technology seek to overcome such difficulties by use of camera systems that form part of the store's infrastructure. The units can be mass produced, yet calibrate themselves to their particular viewpoints by analyzing collected data to determine geometrical layout of shelves within their fields of view. Some embodiments use flash photography that is suppressed when a person is nearby. Watermark data found in product and shelf labels can be used to generate shelf "realograms."

The foregoing and additional features and advantages of the present technology will be more readily apparent from the following detailed description, which proceeds with reference to the accompanying drawing.

BRIEF DESCRIPTION OF THE DRAWINGS

FIG. 3 is a view showing another camera system that may be used in the FIG. 1 store.

FIG. 3A is a detail from FIG. 3, showing a focus arrangement.

FIG. 4 is a top-down view onto a camera system, showing the relatively wider field of view of its 3D sensor, and the relatively narrower field of view of its steerable image camera.

FIG. 5 is a schematic view of four color LEDs on the substrate of a multi-color LED assembly.

FIG. 6 is a diagram showing that light from the color LEDs in FIG. 5 may be projected to different regions by a common lens.

FIG. 7 illustrates an approach to better-blending light from plural multi-color LED assemblies.

FIG. 16A is the realogram of FIG. 15, and FIG. 16B shows the realogram at a later time, after an item with the watermark payload "B" has been removed.

FIG. 17A shows plural boxes of cereal, stacked one in front of the other on a shelf.

FIG. 17B shows the shelf of FIG. 17A after the front box of cereal has been removed.

FIG. 17C illustrates how the apparent scale of the front box differs from the apparent scale of the back box.

DETAILED DESCRIPTION

Certain embodiments of the present technology identify items stocked on store shelves (or removed from store shelves) by analysis of imagery, from which item-identifying watermark or fingerprint data is extracted. In some embodiments, the imagery is flash-illuminated. In other embodiments, extended exposures are employed (i.e., longer than a tenth of a second) to permit low noise, high detail capture using ambient light.

(Watermarks commonly encode Global Trade Item Numbers, or GTINs, in their payloads. Fingerprint data can be linked to an associated database to identify a GTIN that most likely corresponds to analyzed imagery.)

Figure 1:
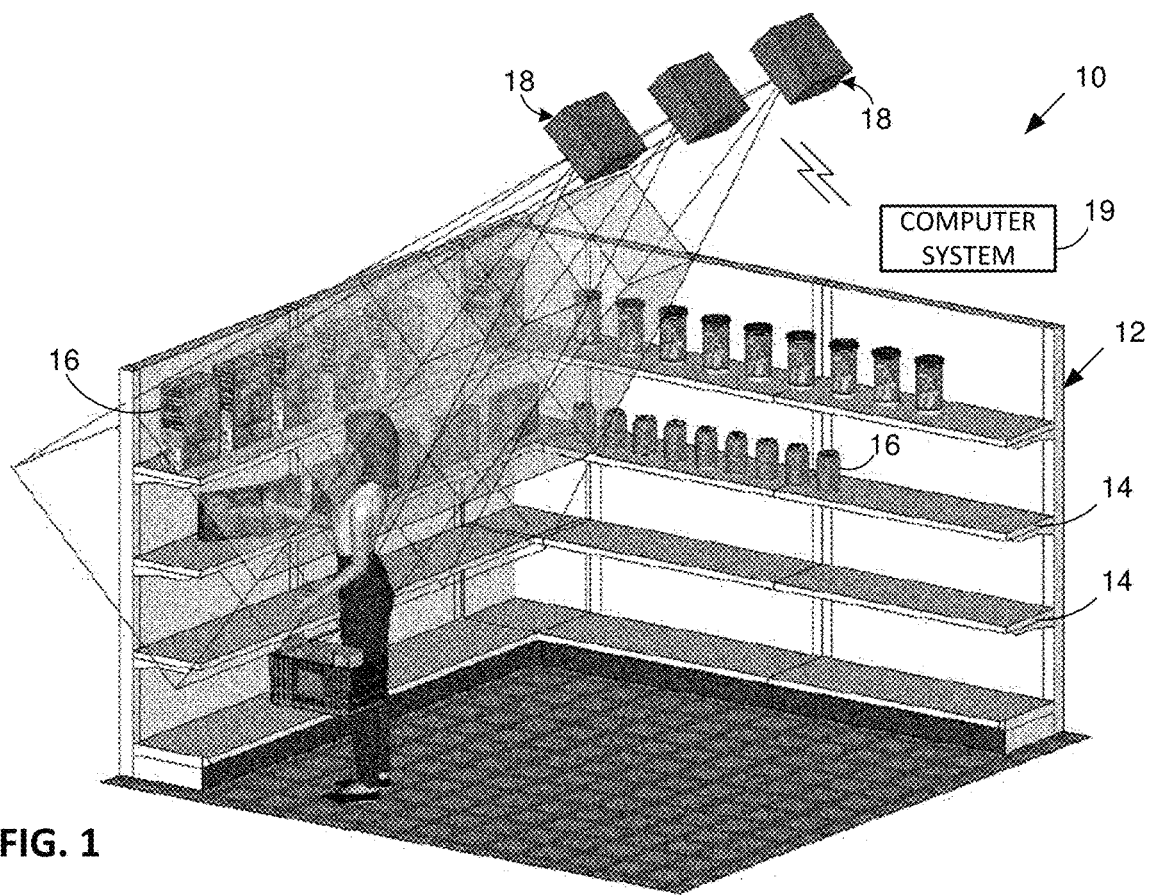
FIG. 1 is an illustration of part of store incorporating illustrative aspects of the present technology.

FIG. 1 depicts part of a store 10 including plural racks of shelving 12, each having multiple shelves 14 spaced vertically over each other. Product items 16, such as boxes of cereal and cans of soft drink, are stocked on the shelves. A plurality of camera systems 18 are mounted (e.g., to the ceiling or to another rack of shelving) for monitoring the shelves and the stocked products. The camera systems exchange data with other system components, e.g., a computer system 19, by wire or wirelessly.

Figure 2A:
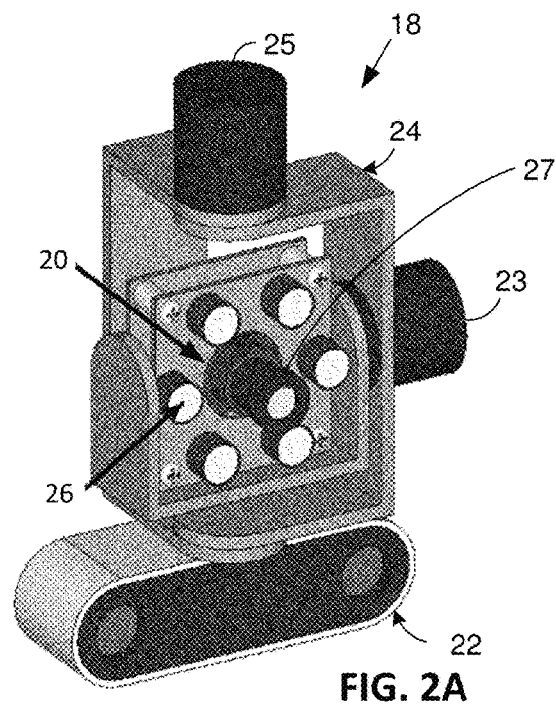
FIG. 2A is a view showing certain elements of a camera system used in FIG. 1.
Figure 2B:
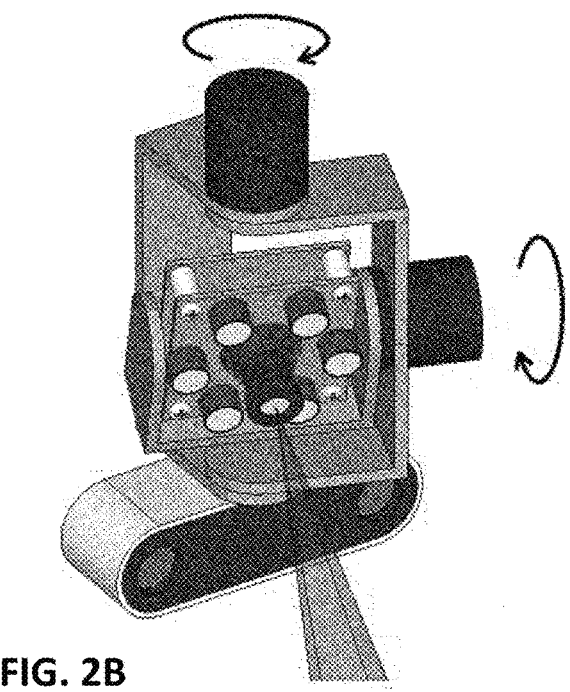
FIG. 2B illustrates how gimbals of the FIG. 2A camera system permit the camera to be steered.

Illustrative camera systems 18 are shown in FIGS. 2A, 2B and 3. The depicted systems include an image camera 20 and a 3D sensor 22. The image camera 20 is affixed to a pan-tilt mount 24, enabling the direction of the camera to be steered in angle and tilt, by two servo motors 23, 25. (Two different gimbaling arrangements are shown: one in FIGS. 2A/2B, and one in FIG. 3.)

In one particular implementation, the camera 20 is a model DMM27UR0135-ML by The Imaging Source, LLC. This is a USB monochrome camera with a ⅓-inch square CMOS sensor (1280×960 pixels) that operates with a global shutter (as opposed to a rolling shutter). The sensor is manufactured by On Semiconductor (Semiconductor Components Industries, LLC), and is model AR0135.

This image camera 20 includes a lens 29, e.g., of 35 mm or 50 mm focal length, that typically has an aperture of f/2 or f/2.8. The FIG. 3 arrangement includes a DC brushless servo motor 29, and associated drive system 31 (including an MXL timing belt), to vary the focus of lens 29, as more particularly shown in FIG. 3A.

The 3D sensor can be a RealSense D435 3D camera, by Intel.

FIG. 4 is a top-down view of camera system 18, illustrating the wide field of view 30 of its 3D sensor 22, and the narrower field of view 32 of a steerable image camera 20.

The image camera is equipped with an illumination ring 26 including multiple LEDs, to enable adequate illumination for long distance imaging (i.e., greater than six or eight feet). The LEDs may be single-color, or they may take the form of multi-chip packages that that can be controlled to emit illumination of plural different colors (or a combination may be used).

Suitable single color LEDs include the Cree XLamp XQ-E series, which emits luminous flux of 300 lumens or more in a variety of colors. The Cree XLamp XM-L series emits white light (with spectral peaks at about 450 and 600 nm), at intensities of 400, 500, 600, 700 or more lumens.

Suitable multi-color LEDs include the Cree XLamp XM-L series, which can emit red, green, blue and white, with luminous flux values in excess of 100 lumens for each color except blue (which emits about 40 lumens). These multi-color devices are comparatively large, as they include separate red, green, blue and white LED dies on a common substrate. Each die is about 0.06×0.06 inches, and they are arrayed in a 2×2 pattern that spans about 0.14×0.14 inches. FIG. 5 is a schematic illustration of such an LED assembly 51, showing the four dies on a common substrate.

Each of the LED assemblies is paired with a corresponding projection lens, to project a flash of the LED light onto a distant shelf. Lenses from the Tina3 family, by Ledil, are suitable. The model FA11905, for example, projects a spot beam that is about 13 degrees in width. The model CA12426 projects a beam that is about 40 degrees in width. A variety of other projection lenses having different beamwidths are naturally available.

The large physical size of the multi-color LED assembly is found to give rise to a problem: the projection lens images the four dies separately. Thus, blue light is projected onto one region of a target in the far field; green onto another; red onto another; and white onto another. The colors don't uniformly blend on the target.

This is shown by FIG. 6, which is a schematic side view showing two of the dies, 36a, 36b, formed on a substrate 37, projecting light through a lens 38, and onto a target 40. As shown, each die projects to a respectively different region (A, B).

In accordance with one aspect of the present technology, this problem is addressed by rotating the orientations of the different LED assemblies, so that they don't all project the same color onto the same region.

FIG. 7 shows one such arrangement, with different LED assemblies oriented differently around the camera lens 29. Naturally, there are many such configurations, each arranged to project light from plural differently-colored LED dies onto a common region of the target.

Figure 8:
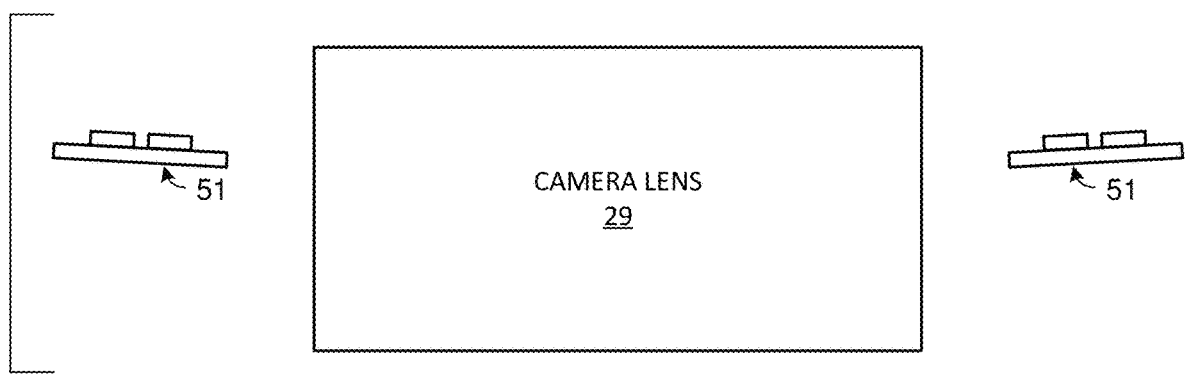
FIG. 8 illustrates another approach to better-blending light from plural multi-color LED assemblies.

Alternatively, or additionally, an embodiment can space each LED lens further from its respective LED substrate, so as to effect a blurring of the far field image. While effective in achieving better blended colors, this approach reduces the projected image intensity, making it less-favored for long distance imaging. A custom lens profile can alternatively be synthesized so as to have the different colors project in overlapping fashion, despite the different die locations on the substrate. This approach, however, suffers by its difficult implementation, and the costs of creating custom lenses. Yet another approach is to cant each of the LED assemblies 51, so they are not all oriented in parallel directions. Such approach is illustrated, in exaggerated schematic fashion, in FIG. 8.

Software enables the user to specify which of the depicted six LED assemblies are activated (and, in the case of color assemblies, with which color), and with what duration. For example, the software may control five of the LED assemblies to flash white light for an interval of 500 microseconds, while the sixth LED assembly flashes red light for an interval of 1 millisecond.

This flexibility permits the illumination spectrum to be customized to correspond to the type of information expected to be derived from the captured imagery. When reading digital watermarks (e.g., Digimarc Barcode marks) from artwork on product packaging, information may be encoded by modulating one or more different color channels. Often the encoding is performed in color channels whose modulation is most-readily apparent under red light (i.e., of the wavelength commonly used in retail barcode scanning systems). Accordingly, the illumination emitted by camera system 18 may not be uniform across the spectrum, but may have a peak at a red wavelength.

Digimarc Barcode marks sometimes employ opposing "tweaks" to different color channels, increasing the luminance of one channel at a location while reducing the luminance of another channel at the same location. To the human eye, these offsetting tweaks help mask the presence of the signal, since the net luminance change is small or zero. But a computer processor can analyze the plural channels separately, and rather than summing them (as is effectively done by the human eye), the processor can generate a difference signal. In a difference signal, the opposing tweaks combine to reinforce each other, producing image data in which the Digimarc Barcode signal is accentuated for decoding. By capturing one frame of imagery under one illumination condition (e.g., red light that reveals artwork encoding in cyan ink), and capturing another frame under a different illumination condition (e.g., yellow and/or blue light that reveals artwork encoding in magenta ink), these different color channels can be sensed separately. The two frames can be subtracted to generate a frame for decoding.

(Additional information on such color-based encoding- and decoding-strategies is found U.S. Pat. No. 9,245,308, the disclosure of which is incorporated by reference.)

A supermarket may stock products whose package artworks are encoded with different strategies, e.g., some packages encoded with Digimarc Barcode in a color channel where modulation is revealed by red light (e.g., by modulating a cyan ink channel), and other packages encoded in channels where modulation is revealed by yellow and/or blue light. The LED illumination system can be configured to use illumination optimized for each different encoding scheme, with a recurrence proportional to that scheme's usage in the store inventory. For example, two-thirds of frames captured by the camera system may be captured under illumination having a peak at red wavelengths, while one third of the frames may be captured under illumination having peaks at blue and/or yellow wavelengths. In a simple embodiment, two frames may be captured under the former illumination condition, followed by one frame captured under the latter illumination condition, where this cycle repeats.

Figure 9:
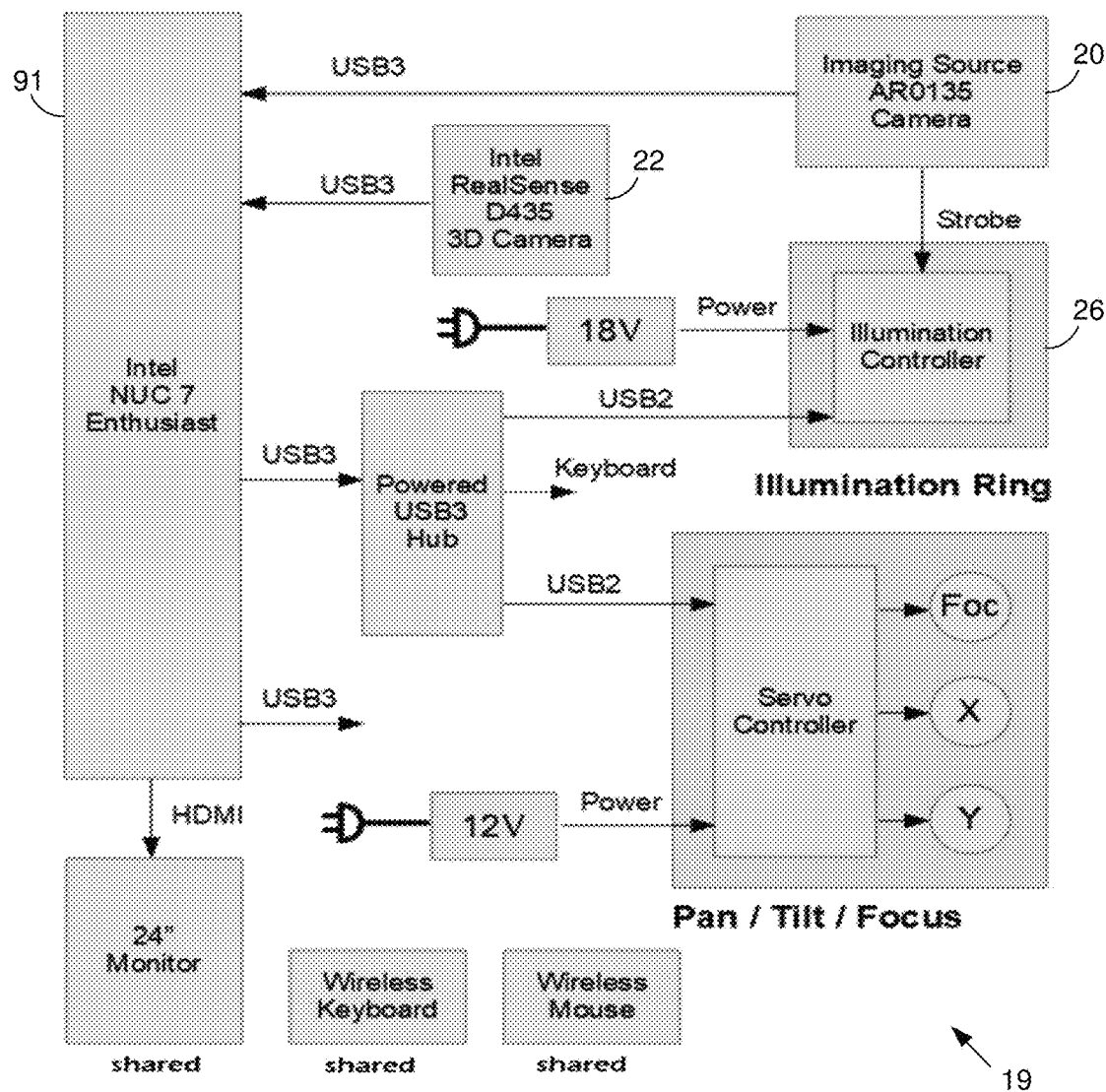
FIG. 9 is a diagram illustrating a computer system that can be used with the camera systems of FIG. 1.

FIG. 9 is a block diagram of a computer system 19 that can be used in embodiments of the present technology. An Intel NUC computer 91 controls the image camera 20, the pan/tilt/focus arrangement, the illumination ring, and the 3D sensor 22. In addition to controlling the hardware elements of system 18, computer system 19 also performs the data analysis and other data processing functions detailed herein.

Figure 10:
FIG. 10 is an image of a rack of shelving, where retail items are stocked.
Figure 11:
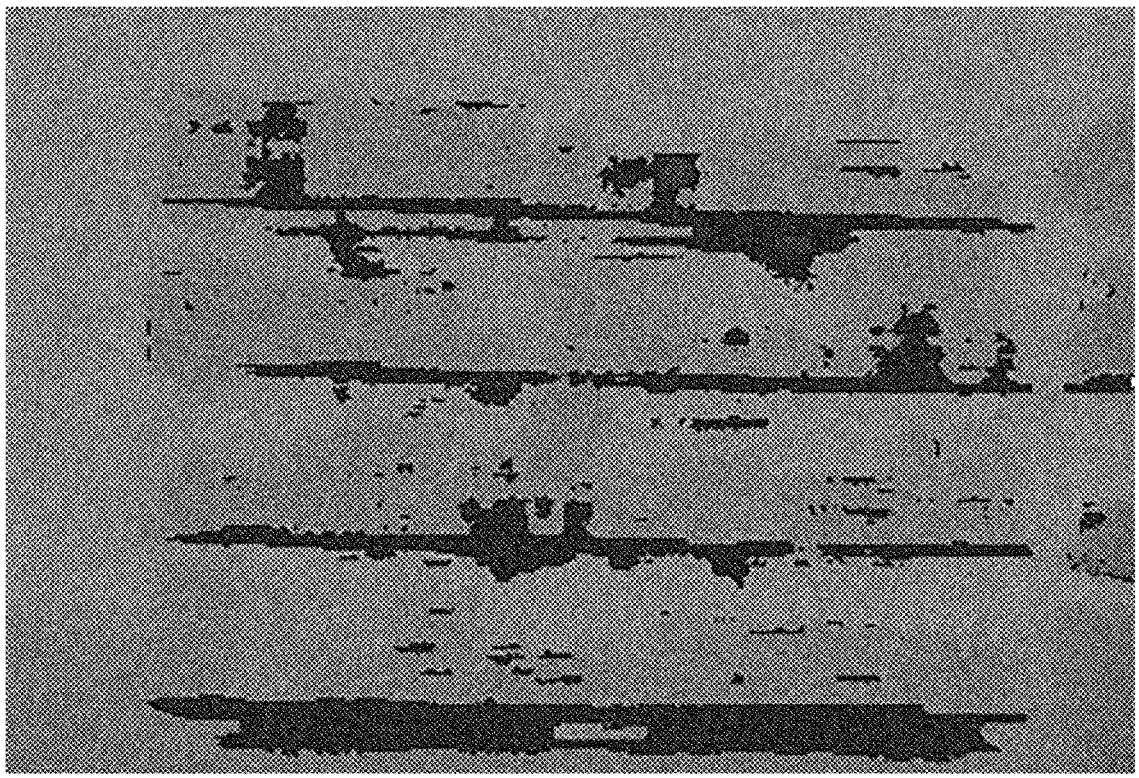
FIG. 11 is a 3D depth map depicting the rack of FIG. 10.

FIGS. 10 and 11 show a camera image, and a depth map image, depicting a rack of shelves, captured by camera system 18. These two images were captured by somewhat spaced-apart sensors, with the depth map image captured from near the floor, and the camera image captured on the level of the top shelf. Usually the images have viewpoints that are within less than a foot, or less than a few inches, from each other—an offset that can generally be ignored. This enables a simple correspondence to be determined between each position in the frame of 3D depth data, and each position in the captured image data, given the pan/tilt parameters by which the camera is oriented, and lens parameters—such as the cameras' fields of view. Establishing such pointwise correspondence between two image frames is routine to those skilled in the art.

Figure 12:
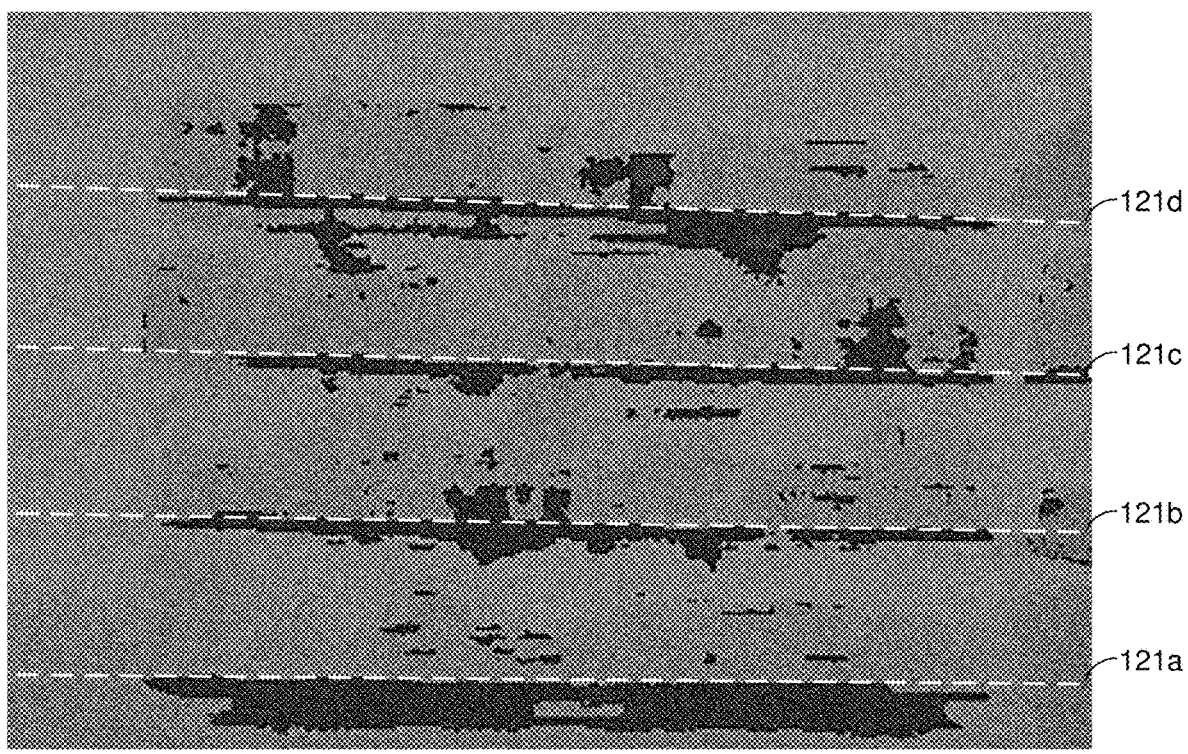
FIG. 12 is FIG. 11, with lines showing the discerned orientations of four shelves.

As can be seen from FIG. 11, current 3D sensors provide relatively low resolution, noisy data. However, despite the poor quality, the 3D profile data can be analyzed to detect the presence and orientation of the four shelves, 121a-121d, as shown in FIG. 12. In particular, an edge-finding algorithm can be applied to the depth map data to identify locations of the shelves. The Hough algorithm is suitable, and may be applied to depth data that has been low-pass filtered to reduce noise. Alternatives include convolution-based methods, methods employing principal component analysis, and Canny and Sobel edge detectors. Artisans are familiar with many such methods, including corresponding tools provided in MatLab and OpenCV software.

In some embodiments, when the camera system is first powered-up, it self-calibrates by determining the geometry of shelving towards which it is pointed, from its particular mounting position. This geometrical knowledge thereafter informs, e.g., how the camera is steered, or how the imagery is parsed (until the next power off/power on cycle).

With knowledge of the shelf locations, the regions between the shelves—where inventory is stocked—can readily be identified. In accordance with an aspect of the present technology, imagery depicting such regions is analyzed for product-identifying data, such as digital watermark data or image fingerprint information (e.g., SIFT data).

In one particular embodiment of the technology, image patches taken from the identified regions are examined, looking for digital watermark data. Locations of such patches are shown by the array of squares 131 in FIG. 13, but they are actually applied to the corresponding camera image data. These patches are positioned to conform to the depicted slant of the shelf on which product is resting. For illustrative clarity, only a limited number of patches are shown. Since shelves are typically positioned about 18 inches apart, and a watermark tile is on the order of an inch or two across, many more patches may be examined in the region between the shelves. (The patches may overlap.)

Alternatively, instead of patches of imagery, an entire image frame captured by the camera 20 may be analyzed. Known techniques can be applied to identify patches having the highest likelihood of including detectable watermark data, and these patches can be further processed to extract watermark data. (Such techniques are detailed, e.g., in U.S. Pat. Nos. 7,013,021 and 9,521,291, the disclosures of which are incorporated by reference.)

Figures 14, 15:
FIG. 14 shows watermark payloads decoded from an array of image excerpts.
FIG. 15 shows the payload data extracted from the imagery of FIG. 14, forming a "realogram."

By such techniques, a map can be generated identifying which products (GTINs) are stocked at which locations on the rack of shelving. FIGS. 14 and 15 illustrate this conceptually (although, again, the watermark data is typically sampled more densely than is practical to illustrate). Each alphabet letter indicates a different GTIN.

Figure 13:
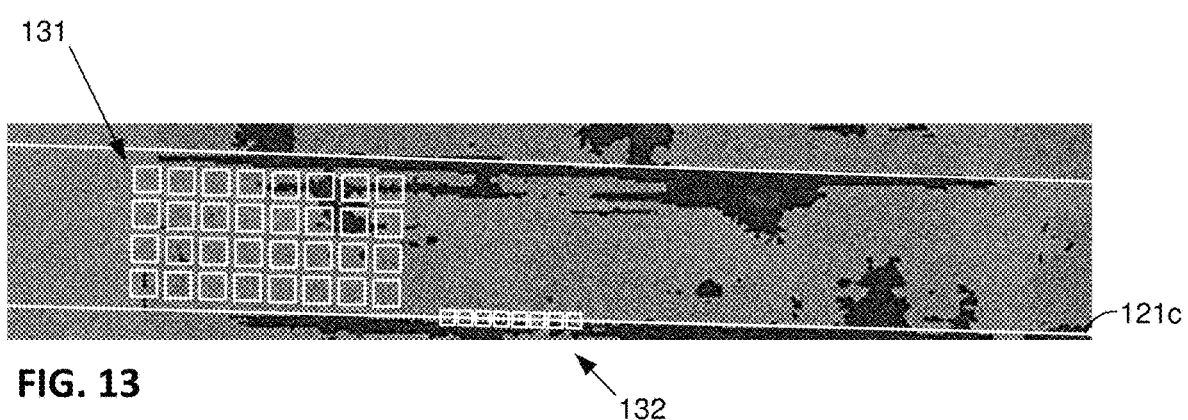
FIG. 13 is an excerpt from FIG. 12, showing arrays of image excerpts that can be analyzed for machine readable data or image fingerprints.

(In FIG. 13, the image excerpts have vertical and horizontal edges that are parallel to edges of the image frame. In FIG. 14, the image excerpts are canted, in accordance with the apparent slope of the shelf. This latter depiction is used as a matter of illustrative convenience; the arrangement of FIG. 13 is more commonly used.)

It will be noted that GTINs are not detected in some locations, despite the presence of stocked items. Various factors can cause this. One is that a patch of imagery spans two different items. Another is that an analyzed patch spans a part of the product artwork that does not convey a watermark signal.

In contrast to a "planogram," which is a store's planned layout of items on a rack of shelving, data produced by the just-described arrangement yields a "realogram"—a map showing an actual layout of items on shelves.

By monitoring changes, over time, to such a realogram, the present technology provides evidence of inventory depletion, e.g., by shoppers picking items to purchase. FIGS. 16A and 16B show realogram data discerned by the FIG. 9 hardware system, from watermark analysis of two images captured a minute apart. As shown by the circled patch in FIG. 16B, a watermark that was previously-detected is now missing. This indicates that an item with the GTIN identifier "B" has been taken from the shelf sometime during that minute.

The present technology can be used to sense the removal of items, even if other items of the same type are still on the shelf. FIGS. 17A and 17B show such a case.

FIG. 17A shows an image excerpt depicting two boxes of stacked cereal 171, 172, one in front of the other, on a shelf. FIG. 17B shows the shelf after the front box has been removed, leaving just box 172. The front face of box 172 is a distance d behind the position at which the front face of box 171 was located.

One way to detect such event is by a change in the sensed 3D depth data at the depicted location. The front of box 171 is relatively closer to the 3D sensor (and closer to the front of the shelf). Its removal changes the distance from the 3D sensor to the remaining inventory of cereal, i.e., box 172. This change signals removal of a box.

Another way to detect such event is by a change in affine parameters characterizing the geometrical presentation of the cereal box watermark in the image excerpt. Such parameters include rotation, scale, x-translation, and y-translation.

The watermark detected from the FIG. 17B image excerpt will have a different scale (and most likely will have different x- and y-translation values) than the watermark detected from the FIG. 17A excerpt. The change in scale is due to the greater distance between the image camera and the box 172 (i.e., the additional distance d). This greater distance causes a reduction in the apparent scale of the watermark, as depicted in the FIG. 17B excerpt. This change of scale is proportional to the change in the apparent width of the boxes, as shown in FIG. 17C. Again, such a change serves as a proxy for depletion—indicating likely removal of an item of inventory.

Such information, discerned by the present system, is written to a time-stamped log file, generating a chronology of when different items were removed from the shelves. Such information can be used as evidence in making probabilistic determinations about which shoppers removed which items (e.g., as further discussed in applicant's' patent publication 20170249491, and in pending application Ser. No. 15/851,298, filed Dec. 21, 2017).

Reductions in watermark scale correspond to increases in reading distance. Sensing the scale of a watermark the front-most item on a shelf, and comparing it to the scale of a watermark when the shelf is fully-stocked with such items, yields an indication of the amount of space at the front of the shelf that is vacant of stock. This can serve as an estimate of how many items of inventory are required at that location to restore the area to a fully-stocked status. Store management can dispatch a clerk to restock the shelf accordingly.

Alternatively, a shelf label watermark can serve as reference data, by which set-back positions of a product on the shelf can be judged. That is, the scale of the watermark sensed from a shelf label corresponds to the scale of watermarks at the front edge of the shelf. Products stocked behind that label have a smaller watermark scales. The difference in scales between a watermark sensed from a product, and a watermark sensed from a shelf label, is proportional to the distance of such product behind the front edge of the shelf. Again, such differences can be correlated with the number of items missing from the front of the shelf.

The positions of detected shelf-labels—and the GTINs encoded in their machine-readable data—can be included in realogram data produced using the system of FIG. 9. If the position of the shelf label, and the corresponding stock of products, are not properly aligned, store management can dispatch a clerk to make appropriate adjustments.

Reference was made to flash-illuminated image capture. Flash illumination is desirable, when imaging from a distance, for various reasons. One is that it allows a smaller lens aperture (i.e., a higher f/stop) to be used, which in turn increases the depth of field that is in-focus in the resulting imagery. Another is that the additional illumination reduces the influence of sensor noise that all imaging sensors contribute to imagery, yielding a higher fidelity image signal—one from which a watermark can be better-recovered due to an improved signal-to-noise ratio.

Shoppers, however, can find it unnerving to be photographed by camera systems that occasionally emit bright flashes of light. In accordance with another aspect of the present technology, data periodically-captured by system 18 is analyzed to detect the presence of a shopper. By analyzing data from series of nearby camera systems, software can anticipate the expected arrival of a shopper. In either circumstance, software can suspend capture of images with flash illumination. Data analyzed to detect shoppers can be either image data captured by the image camera 20 (without flash illumination), or 3D data captured by the 3D sensor 22.

Techniques for detecting shoppers in still and video imagery are known to artisans from prior art patent documents, such as U.S. Pat. Nos. 6,195,121, 6,999,600, 7,652,687, 7,688,349, 7,796,780, 7,801,330, 9,124,778, and 20050104958, the disclosures of which are incorporated by reference. Neural networks, using the AlexNet, VGG-16, or Inception (c.f., U.S. Pat. No. 9,715,642) architectures, can also be trained to detect shoppers in imagery, using a corpus of in-store training images that have been labeled as containing a shopper or not. Still other approaches are based on blob detectors that identify a shape that locally-occludes the fronts of two or more vertically-spaced shelf front-edges. (The shelf front-edges can be identified from the 3D sensor data, as described earlier; see the Wikipedia article for a discussion of Blob Detection techniques familiar to artisans.) Yet other approaches simply count how many pixels change value by more than 10 digital numbers, or some other threshold number, between two frames captured at different times (e.g., separated by 2, 5, 10 or more seconds). If the count exceeds 100, or 1000, or some other threshold value, then the system concludes that a person is in the field of view of the system, and suspends flash-illuminated image capture.

Figure 18:
FIG. 18 shows how an embodiment of the present technology captures a sequence of images in correspondence to the apparent geometry of a rack of shelving.

In an illustrative implementation, the camera 20 captures a sequence of overlapping images, with the pan-tilt mount 24 centering the camera's field of view at successive locations in the stock regions between shelves. A row of different, often vertically-staggered, image frames are captured along a shelf, as shown in FIG. 18, following the shelf as seen from the camera system's viewpoint. When an end of a shelf is reached, the steerable camera arrangement tracks a similar (possibly reverse) path on another shelf, until all the shelves are imaged. The process then repeats.

Given perspective distortion from the viewpoint, the fronts of the shelves commonly appear non-parallel, so the tracks along shelves also commonly follow non-parallel paths.

In some embodiments, imagery is captured while the camera is in motion—relying on a brief, intense flash interval to capture a sharp image. In other embodiments, the camera is stationary when imagery is captured. This allows flash illumination of less intensity to be employed, which is less intimidating to shoppers. Or imagery can be captured without flash illumination, but rather with a long exposure.

In the illustrated arrangement, each image depicts a portion of the front shelf edge beneath the stock region (and a portion of the front shelf edge above, if present), so that shelf label data can be gathered from the same imagery. However, this is not strictly necessary.

Each captured image is analyzed for product identifying data, whether machine-readable data, or image fingerprint data. Discrete excerpts of each image may be analyzed (e.g., at a fixed increment of spacings (like in FIG. 13), or the entire image may be analyzed for data—wherever found.

A sequence of images spanning an entire set of shelving may be taken in a burst (subject to the speed at which pan-tilt mount can be re-steered), or a single image may be taken, and then after an idle interval, a next image may be taken, etc. The idle interval may be, e.g., a second or less, 5 seconds, 15 seconds, 60 seconds, or five minutes (or more). In either case, the sequence can be paused when a shopper is detected in the vicinity.

Even if imagery is captured without regard to shelf geometry, the shelf geometry can nonetheless be used in parsing the imagery, e.g., identifying a sub-region within a frame of imagery that should be processed for item-identification, or identifying sub-regions that should be ignored.

Figure 18A:
FIGS. 18A and 18B show how information about shelf geometry can be used to parse imagery, to identify a region to be processed (and regions not to be processed).
Figure 18B:
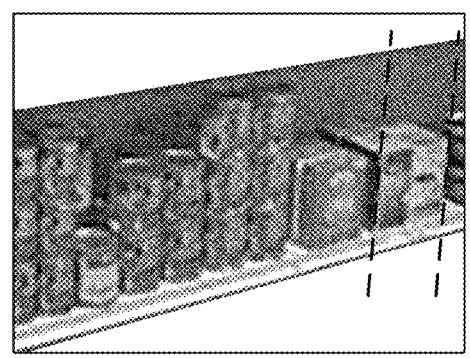

This is shown by FIGS. 18A and 18B. FIG. 18A shows a captured image. FIG. 18B shows the FIG. 18A image after parsing, using knowledge of the shelf geometry, identifying a sub-region to be processed (and identifying two sub-regions to be ignored).

Although shelves may be depicted at a wide variety of angles in captured imagery (depending on viewpoint), product stacked vertically on the shelves typically appears substantially vertical in the captured imagery (i.e., relative to the vertical and horizontal edges of the image frame). Edges that extend up from a shelf, in substantially vertical orientations, can be used to further parse elements of a depicted scene for analysis. Particularly useful in scene parsing is image analysis that locates two essentially-parallel edges, of similar length (e.g., +/−10%). These commonly correspond to opposing vertical edges of an item (e.g., a cereal box, or a can of vegetables), or a stack of such items. An image sub-region bounded by a shelf, below, and two essentially parallel edges to the side (e.g., as shown by dashed lines in FIG. 18B), often contains a single item, or plural items that are each watermarked with the same payload. These two cases can usually be distinguished by determining the {X,Y}origin of watermarks detected from different patches within this image sub-region. If all patches indicate a similar origin, this usually indicates all are from a single item. If plural patches indicate different origins (while conveying a common watermark payload), this is evidence that the sub-region spans plural instances of a single item.

Concluding Remarks

Having described and illustrated various feature of the technology with reference to exemplary embodiments, it should be recognized that the technology is not so-limited.

For example, while the detailed embodiments employ a steerable camera that captures flash-illuminated images, neither is required.

The camera may be non-steerable. Such a camera may have a lens that captures a wider field of view than the lens 29 discussed above. A suitable camera for a fixed field of view arrangement uses a fixed-focus, wide angle lens, such as a Varifocal 2.8-12 mm, f/1.4 lens, set to 2.8 mm.

In addition, or alternatively, the captured images may be illuminated with ambient light. In embodiments employing ambient light, long exposures (e.g., of 0.1, 0.25, 0.5, or 1 second or longer) may be used.

In some embodiments, a high-resolution image—akin to that acquired with a steerable camera using a telephoto lens—is derived from plural low-resolution images, using super-resolution techniques. A series of low-resolution images captured by a single camera, e.g., taken at intervals of a fraction of a second, or several or longer seconds, even of a static scene, are never exactly identical. One reason is that the structure to which the camera is mounted typically has some vibration, due to HVAC equipment, nearby traffic, etc., causing scene-to-pixel mappings to vary one frame to the next. The information from plural such frames can be combined to yield image resolution higher than that of any component image. Such techniques are known, e.g., from patent publications 20110150331, 2007019887 and 2005280714, the disclosures of which are incorporated herein by reference.

In other arrangements, a super resolution image is generated from a single low-resolution image, using a system trained to synthesize fine details associated with subjects having certain previously-learned texture patterns. Such techniques can be used with watermarks as well, as they typically share a common synchronization (reference) signal. See, e.g., patent publications 20190378242 and 20180293707, the disclosures of which are incorporated herein by reference.

It is also not essential that a depth sensor be used. The geometry of a shelving rack, towards which a camera system is pointed, can be discerned by analysis of conventional camera imagery, e.g., using long edge detection. In some such embodiments, a camera with a wide field of view is used to capture imagery from which geometry is discerned. This data is then used to guide image capture by a steerable camera with a smaller field of view.

While the geometry of an imaged scene can be determined by finding long lines associated with shelf fronts, other arrangements alternatively, or additionally, can sense the geometry by reference to rotations of watermarks depicted at different locations within the imagery.

Figure 19A:
FIG. 19A is an image showing racks of shelving, with shelves oriented at different apparent angles.
Figure 19B:
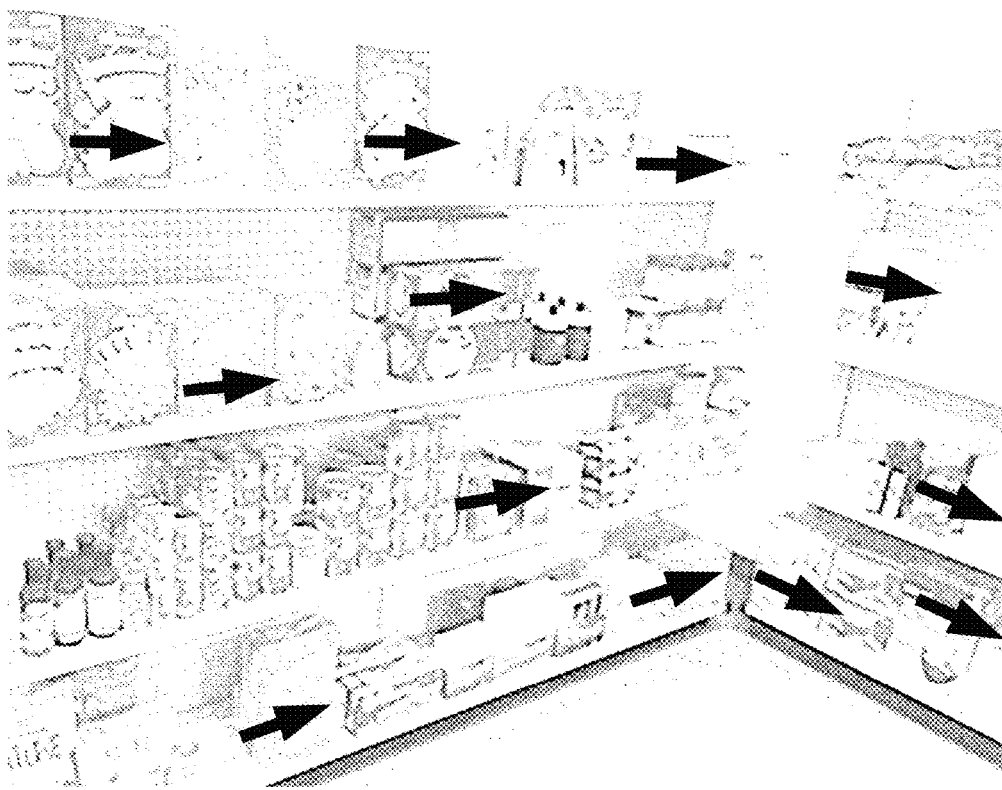
FIG. 19B shows geometrical information revealed by orientation of watermarks detected at different positions in the scene of FIG. 19A.

Shelves may be presented in imagery at a wide variety of angles, as illustrated by FIG. 19A. Digital watermarks are encoded in blocks that are tiled horizontally and vertically across package artwork. A product resting on a shelf will typically present an apparent watermark orientation corresponding to the apparent orientation of the shelf it is resting on. Thus, imagery can be sampled to gain data about the apparent orientation of shelves in a frame of captured imagery, by examining detected watermark orientations at different locations in the frame. The bold arrows in FIG. 19B show watermark orientation data determined from different regions of the FIG. 19A depiction. Such a sparse sampling of orientation data is sufficient for the computer system 19 to guide a steerable camera to capture imagery informed by the shelf geometry.

Sensing of a person near a camera system can be performed by means different than the image camera or 3D sensor. For example, data from a thermal imager can be used. Likewise, presence of a person can be sensed using emissions from a wireless device carried by the person, or the person's tote or cart—such as Bluetooth, WiFi, 3G/4G/5G cellular pings, or a wireless beacon.

While still image cameras are used in the detailed embodiments, other embodiments can use video cameras in their stead. Cameras of both sorts can be equipped with a variable zoom lens. Such zoom lenses can be selectively activated to gather magnified views of any regions from which product-identifying information is not discerned from normal views, to ensure that nothing is being missed.

Although item identification by watermark or fingerprint techniques is presently preferred, item recognition by neural network techniques is also an option. A variety of such techniques are detailed in our pending application Ser. No. 15/726,290, filed Oct. 5, 2017 (now U.S. Pat. No. 10,664,722).

Some of applicant's previous work to enhance operations at bricks and mortar stores and distribution facilities is detailed in published patent applications 20170249491 and 20160189277, and in pending application Ser. No. 15/830,874, filed Dec. 4, 2017 (now U.S. Pat. No. 10,552,933), Ser. No. 15/851,298, filed Dec. 21, 2017, and Ser. No. 16/246,423, filed Jan. 11, 2019 (now U.S. Pat. No. 10,885,336). These documents concern, e.g., determining store inventory, discerning which shoppers pick which products for purchase, novel uses of information from shelf labels, and associated image processing techniques. To comply with the statutory requirement of conciseness, such disclosures are not bodily incorporated into the present text, but they are incorporated herein by reference. Applicant expressly teaches that each of the features and arrangements detailed in those documents can be employed in conjunction with the features and arrangements detailed in the present document.

Technology for cashierless checkout, including for uniquely identifying shoppers, and tracking their routes through stores, is detailed in the just-cited patent documents. Other such technology is familiar to artisans from patent literature by Amazon, Walmart, and others. (See, e.g., U.S. Pat. No. 10,044,987 to Amazon and U.S. Pat. No. 10,127, 438 to Standard Cognition.) The present technology is well-suited for use in such arrangements.

In some embodiments, extraction of watermark data is at least partially performed "at the edge," i.e., using a processor within a housing of the camera system 18, or using a processor shared between just a fraction of the camera systems in a store. In such an embodiment, a camera system 18 can gather data for processing when no shopper is nearby. Then, when a shopper is nearby and image capture is suspended, the system can focus exclusively on processing the earlier-collected imagery. Image capture and image processing are thus both irregular—depending on traffic in the store.

Others of the noted operations can similarly be performed at the "edge" of the system. Alternatively, the noted operations can be performed by a central processor (on-premises, or in the cloud), or tasks can be divided between several processors, e.g., a processor in the camera systems 18, a processor in the aisle—with which local camera systems 18 exchange data, a central processor for the store, and a cloud computer.

While certain embodiments employ a timing belt to vary focus of the lens, a variety of other approaches can be employed. These include a liquid lens, such as a Varioptic C-C-39NO-250 (a 25 mm, f/4.0 lens) or C-S-39NO-158 (a 15.8 mm, f/4.0 lens), an electrically-focused polymer lens, such as the Optotune EL-16-40-TC (a 16 mm, −2 to +3 diopter lens), a voice coil-based autofocus arrangement—as commonly found in smartphones, or a piezoelectric focus arrangement, such as the New Scale Technologies Squiggle Motor.

Various auto-focus algorithms are well known. Commonly, such techniques generate a focus metric by a fast, statistical analysis of a frame of image data (e.g., a contrast metric), and adjust a focus parameter (e.g., the belt in FIG. 3A) in a feedback loop so as to improve the focus metric, until a satisfactory condition is reached. Artisans are well familiar with such techniques, so same are not belabored here.

In some embodiments, captured imagery is geometrically-warped in accordance with 3D sensor data, to de-skew presentation of product faces prior to watermark decoding. For example, an image of a cereal box front, which is imaged from a viewpoint that is not normal to the center of the front, but rather is captured with a skew of 30 degrees horizontally and 20 degrees vertically, is stretched so as to counteract the perspective distortion associated with such viewpoint. The de-skewed imagery can then be submitted to a watermark decoder module, increasing the probability of successfully decoding watermark data from the cereal box artwork.

Similarly, in some embodiments, imagery depicting a shelf of products is rotated to counter-act the apparent tilt of the shelf from the viewpoint of the camera system 18. By so-doing, vertical in the image corresponds to vertical in the real world—simplifying certain analyses.

Figure 20:
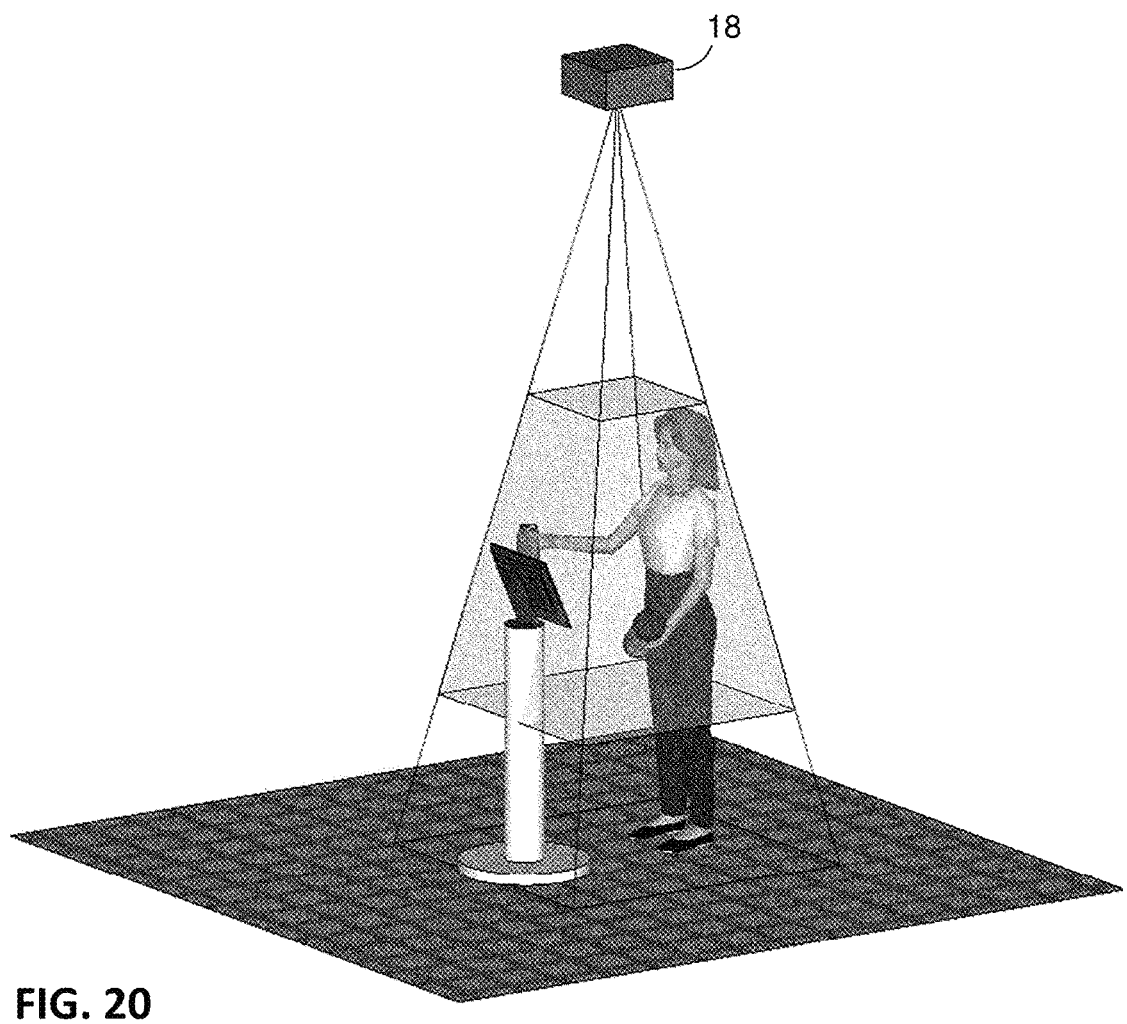
FIG. 20 shows a checkout embodiment employing aspects of the present technology.

Although the technology has been described primarily with reference to camera systems that monitor stock on shelving, the technology can also be used elsewhere in a store. An example is at a checkout station, either at the front of the store, or elsewhere. FIG. 20 shows such an arrangement, in which a shopper interacts with a kiosk to complete a purchase transaction. Purchased items may be identified by a camera system overhead, e.g., as the shopper transfers items from a basket to a bag. The camera system may capture an image spanning a fixed field of view. Alternatively, it may use 3D information to steer itself and capture images of items with a more limited field of view, achieving higher-resolution capture than would be possible with a fixed field of view system. As with the other systems detailed here, flash illumination can be employed, or ambient lighting can be used.

Similarly, while the technology has been described primarily with reference to camera systems that are fixed, movable camera systems are contemplated too. For example, shopping carts may be equipped with technology detailed herein to gather imagery from which, e.g., inventory data is gathered. Similarly, aspects of the present technology can be employed in robotic data collection platforms (e.g., illuminating a field of view with a sequence of different LED flashes).

It will be recognized that the camera image sensor in the detailed embodiments has relatively low resolution (i.e., 1280×960, or 1.2 megapixels). Higher resolution sensors can naturally be used, such as 8 MP or 48 MP. However, for mass production considerations, a less-expensive, low-resolution sensor—paired with a pan/tilt mount—offers a more attractive proposition at present. (Eventually, a high resolution sensor may become economical, in which case physical steering can be abandoned, and electronic steering—by electronically panning through a large captured image field—can be employed.)

As noted, flash-illuminated image capture is suspended when a shopper (or other person) is proximate. Absent more specific indication, such proximity means within about 15-20 feet, depending on implementation. For example, if camera systems 18 are spaced every six feet down the length of a store aisle, and have a field of view spanning seven feet of shelving (i.e., 3.5 feet either side of the camera system's linear position along the aisle), then flash-illumination by a particular camera system should be suppressed if the shopper is in view of (a) that system, or (b) either of two immediately-adjoining systems on each side. Of course, all these parameters can be adapted based on the needs of particular applications.

While the detailed embodiments use the Intel RealSense 3D sensor, it will be understood that 3D depth data can be obtained otherwise, such as by time of flight cameras. Another alternative is by use of stereo image cameras. One or both of the cameras in such a stereoscopic imager can also be used to provide camera imagery from which product-identifying data is determined.

Figure 21:
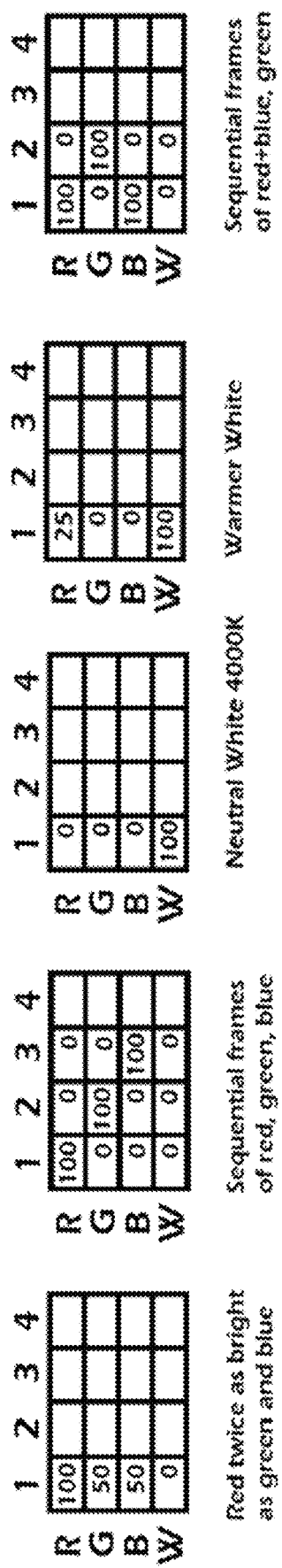
FIG. 21 shows different tables by which operation of an illumination system can be programmably configured.

The sequence, color, and timing by which the LEDs are operated, can be fixed by hardware, or can be programmable. An illustrative user interface in a programmable implementation permits an operator to specify a repeating sequence of four LED patterns—one per frame of captured camera imagery. A table structure can be used, as shown in FIG. 21, to specify the sequence, and relative intensities. (In this illustrative embodiment, each LED is operated with a constant current of 1 ampere; brightness is controlled by the interval of illumination.) If columns in a table are blank, they are ignored.

Although the detailed embodiments contemplate imaging a rack of shelving on one side of an aisle, the technology can be adapted to image two racks of shelving, one on each side of the aisle. For example, a camera system can be suspended over the center line of an aisle, and oriented to point down a length of the aisle. A mirror arrangement extends from the front of the camera system, by a bracket positioned above the camera's field of view. This arrangement positions a mirror along the camera's axis, oriented at 45 degrees relative to that axis, which is switchable between two positions, to redirect the system's field of view to one side of the aisle or the other. Imagery can be gathered from one rack of shelving on one side of the aisle. The mirror arrangement is then flipped to its other state, and the process repeats for a second rack of shelving on the opposite side of the aisle.

In the illustrative embodiments, product identification is performed by decoding digital watermark data encoded in artwork of product packaging. But other techniques can naturally be used, including decoding other machine-readable symbologies that encode plural-bit data (e.g. visible, i.e., black and white 1D and 2D, barcodes), and image fingerprinting.

Image fingerprinting by the SIFT method was noted above. SIFT is detailed, e.g., in U.S. Pat. No. 6,711,293. There are many other such methods, including HOG, SURF, ORB, and FAST. Such methods discern distinctive features in reference artwork (e.g., product packaging) by which such artwork can later be recognized (by searching a database of reference fingerprint data for a closest match). Many image fingerprinting techniques are implemented by popular image processing software libraries, such as MatLab and OpenCV. Additional information on such feature-point recognition of artwork is provided in applicant's patent documents identified elsewhere, as well as in U.S. Pat. No. 9,269,022 and patent application Ser. No. 15/955,481, filed Apr. 17, 2018 (now U.S. Pat. No. 10,740,613).

The term "essentially," when used in referring to a direction herein, means within five degrees. The term "substantially" means within 25 degrees. The word "or" is used in its non-exclusive sense.

"Edge processing," as used herein, means processing by a processor other than a processor that serves an entire store. For example, edge processing may be performed by a processor in each of the detailed camera systems 18. Or edge processing may be performed by a processor that serves a group of several camera systems in a store (e.g., all the camera systems in a particular store aisle), but serves less than all of the camera systems in the store.

It will be recognized that mundane details of implementation are sometimes omitted where same would be routine for the artisan.

Some of the features detailed herein are characterized by terms such as "desirably," "typically," "commonly," or "preferably." It should be understood that each such specified arrangement is the usual case—and often is applicant's preference, but is not a requirement of the technology. Implementation in a contrary fashion is possible, and indeed is expressly contemplated by this specification. (Likewise with expressions such as "may" or "can." The feature so-characterized can be included, or in other embodiments can be omitted.)

The methods and algorithms detailed above can be implemented in a variety of different hardware structures, including a microprocessor, an ASIC (Application Specific Integrated Circuit) and an FPGA (Field Programmable Gate Array). Hybrids of such arrangements can also be employed.

By microprocessor, applicant means a particular structure, namely a multipurpose, clock-driven integrated circuit that includes both integer and floating point arithmetic logic units (ALUs), control logic, a collection of registers, and scratchpad memory (aka cache memory), linked by fixed bus interconnects. The control logic fetches instruction codes from an external memory, and initiates a sequence of operations required for the ALUs to carry out the instruction code. The instruction codes are drawn from a limited vocabulary of instructions, which may be regarded as the microprocessor's native instruction set.

A particular implementation of one of the above—detailed processes on a microprocessor—such as the process of finding long edges in 3D data, or determining the scale of a watermark—involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangement allows multiple operations to be executed in parallel. (Some elements—such as the bus structure and cache memory may be shared between the cores.) Examples of microprocessor structures include the Intel Xeon, Atom and Core-I series of devices, and various models from ARM and AMD. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data. Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of certain of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to find long edges, and programmed tomorrow to prepare a user's tax return, an ASIC structure does not have this flexibility. Rather, an ASIC is designed and fabricated to serve a dedicated task. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.) In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of the detailed algorithms offer higher performance, and consume less power, than implementations employing microprocessors. A drawback, however, is the significant time and expense required to design and fabricate circuitry that is tailor-made for one particular application.

A particular implementation of any of the above-detailed processes, e.g., for finding long edges in 3D data, or determining the scale of a watermark, using an ASIC again begins by defining the sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDLCoder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, an external memory. By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Intel, and the Spartan FPGA from Xilinx.

As with the other hardware structures, implementation of the above-detailed processes on an FPGA begins by describing a process in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Software instructions for implementing the detailed functionality can be authored by artisans without undue experimentation from the descriptions provided herein, e.g., written in C, C++, Visual Basic, Java, Python, Tcl, Perl, Scheme, Ruby, Caffe, TensorFlow, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user. Some or all of the functionality detailed in this specification can be implemented in operating system software, application software and/or as embedded system software.

Different of the functionality can be implemented on different devices. For example, in a system in which a ceiling-mounted camera system captures imagery of a shelf, a processor module in the ceiling-mounted system (e.g., an ARM processor) can determine the affine parameters of a watermark in the imagery, and a more distant processor can perform other of the processing (e.g., extracting the watermark payload). Thus, it should be understood that description of an operation as being performed by a particular device is not limiting but exemplary; performance of the operation by another device, or shared between devices, is also expressly contemplated.

In like fashion, description of data being stored on a particular device is also exemplary; data can be stored anywhere: local device, remote device, in the cloud, distributed, etc.

In some respects the present technology is akin to that detailed in patent publications 20180218224 and 20180189763, assigned to Datalogic USA, Inc., which detail steerable camera systems for use in stores. The present technology can be viewed as expanding and enhancing such technology. Details of the systems taught in these two publications can be incorporated into the presently-described technology, and vice versa.

In addition to documents referenced elsewhere, details concerning watermarking are known from applicant's previous patent filings, including patent documents U.S. Pat. Nos. 6,590,996, 9,521,291, 9,747,656, 9,818,150, 9,819,950, 9,922,220, 9,959,587, 20140119593, 20170024840, 20180005343, 20190266749, 20190306385 and 20190332840. Many such watermarks are imperceptible or steganographic, meaning they are not noticeable to a viewer examining watermarked packaging from a typical viewing distance (e.g., 20 inches) in typical retail lighting (e.g., 50-85 foot-candles), who has not been alerted previously to the existence of such encoding.

Some of applicant's other work relating to the present technology is detailed in patent documents U.S. Pat. No. 10,488,912, 10,242,434, 9,451,406, 20160189277, 20140244514, and 20120214515, and in patent application Ser. No. 15/830,874, filed Dec. 4, 2017 (now U.S. Pat. No. 10,552,933).

This specification has discussed several different embodiments. It should be understood that the methods, factors, elements and concepts detailed in connection with one embodiment can be combined with the methods, factors, elements and concepts detailed in connection with other embodiments. While some such arrangements have been particularly described, many have not—due to the large number of permutations and combinations.

Applicant similarly recognizes and intends that the methods, elements and concepts of this specification can be combined, substituted and interchanged—not just among and between themselves, but also with those known from the cited prior art. It would violate the Patent Act's requirement that this specification be "concise" if applicant were to belabor this document with individual recitation of each such specific combination of elements. However, all such combinations are expressly intended by applicant, and should be understood as being disclosed by this specification. Implementation of such combinations is straightforward to the artisan from the teachings provided in this disclosure.

While this disclosure has detailed particular orderings of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

The invention claimed is:

1. In a product distribution facility that has racks of shelving, the racks of shelving comprising plural shelves spaced above each other for storing products, an ambient inventorying system comprising:
a sensing subsystem including an image sensor and a 3D sensor, said sensing subsystem being mounted to a ceiling of said distribution facility or to one of said racks of shelving;
one or more processors and one or more memories, the one or more memories containing software instructions that configure the system to perform acts including:
processing data from the 3D sensor to identify a first shelf, and a second shelf next-above the first shelf;
identifying—in imagery captured by the image sensor—a storage region between said identified first and second shelves; and
processing an image excerpt that depicts part of said identified storage region, to thereby identify a product stored on said first shelf;
wherein said instructions further configure the system to (A) operate a flash to illuminate imagery captured by the image sensor and to suppress operation of the flash when a person is within view of said image sensor, and (B) to capture said imagery with image sensor exposures of longer than a tenth of a second.

2. The system of claim 1, in which the software instructions further configure the system to perform acts including:
discerning, from data captured by the sensing subsystem, two essentially-parallel edges that extend up, substantially vertically, from an identified first shelf; and
selecting said image excerpt to include a region between said two essentially-parallel edges.

3. The system of claim 1, in which the software instructions further configure the system to perform acts including:
estimating a viewpoint distortion function for said image excerpt; and
applying a counter-distortion to the image excerpt to reduce viewpoint distortion, prior to processing said image excerpt to identify a product stored on said first shelf.

4. The system of claim 1 including a flash with LEDs of plural different colors, said instructions configuring the system (i) to operate said flash to emit a first color of illumination at a first time during which the image sensor captures first imagery; (ii) to operate said flash to emit a second, different, color of illumination at a second time after the first time, during which second time the image sensor captures second imagery; and (iii) to process excerpts of said first and second imagery to thereby identify a product stored on said first shelf.

5. The system of claim 1 in which said instructions configure the system to determine, from a shelf identified by processing data from the 3D sensor, a sub-region within the captured imagery that should be ignored.

6. The system of claim 1 in which the sensing subsystem comprises a gimbal arrangement on which the image sensor is mounted, the gimbal arrangement being motor-driven to enable pivoting of the image sensor about at least one axis.

7. The system of claim 1 in which said instructions configure the system to determine, from a shelf identified by processing data from the 3D sensor, a sub-region within the captured imagery that should be ignored.

8. The system of claim 1 in which the sensing subsystem comprises a gimbal arrangement on which the image sensor is mounted, the gimbal arrangement being motor-driven to enable pivoting of the image sensor about at least one axis.

9. The system of claim 1 including a flash comprising one or more LEDs.

10. The system of claim 9 in which said flash comprises LEDs of plural different colors, said instructions configuring the system (i) to operate said flash to emit a first color of illumination at a first time during which the image sensor captures first imagery; (ii) to operate said flash to emit a second, different, color of illumination at a second time after the first time, during which second time the image sensor captures second imagery; and (iii) to process excerpts of said first and second imagery to thereby identify a product stored on said first shelf.

11. The system of claim 9 in which said instructions configure the system to determine, from a shelf identified by processing data from the 3D sensor, a sub-region within the captured imagery that should be ignored.

12. The system of claim 1 in which said excerpt is less than an entirety of an image frame captured by the image sensor.

13. In a product distribution facility that has racks of shelving, the racks of shelving comprising plural shelves spaced above each other for storing products, an ambient inventorying method comprising the acts:

operating a sensing subsystem, comprising an image sensor and a 3D sensor mounted to a ceiling of said distribution facility or to one of said racks of shelving, to capture imagery and 3D data;

processing the 3D data to identify a first shelf, and a second shelf next-above the first shelf;

identifying, in imagery captured by the image sensor, a storage region between said identified first and second shelves; and processing an image excerpt that depicts part of said identified storage region, to thereby identify a product stored on said first shelf;

the method further including (A) operating a flash to illuminate imagery captured by the image sensor and to suppress operation of the flash when a person is within view of said image sensor, and (B) capturing said imagery with image sensor exposures of longer than a tenth of a second.

14. The method of claim 13 in which the sensing subsystem includes a flash.

15. The method of claim 13 further comprising:

discerning, from data captured by the sensing subsystem, two essentially-parallel edges that extend up, substantially vertically, from an identified first shelf; and selecting said image excerpt to include a region between said two essentially-parallel edges.

16. The method of claim 15 further comprising:

estimating a viewpoint distortion function for said image excerpt; and applying a counter-distortion to the image excerpt to reduce viewpoint distortion, prior to processing said image excerpt to identify a product stored on said first shelf.

17. The method of claim 13 further comprising:

(i) operating a flash with LEDs of plural different colors to emit a first color of illumination at a first time during which the image sensor captures first imagery;

(ii) operating said flash to emit a second, different, color of illumination at a second time after the first time, during which second time the image sensor captures second imagery; and (iii) processing excerpts of said first and second imagery to thereby identify a product stored on said first shelf.

18. The method of claim 13 further comprising:

determining, from a shelf identified by processing data from the 3D sensor, a sub region within the captured imagery that should be ignored.

* * * * *